United States Patent
Casey et al.

(10) Patent No.: US 12,537,081 B2
(45) Date of Patent: Jan. 27, 2026

(54) INTER VERTEBRAL CAGE WITH INTEGRATED TRANSMITTER

(71) Applicant: Carlsmed, Inc., Carlsbad, CA (US)

(72) Inventors: Niall Patrick Casey, Carlsbad, CA (US); Michael J. Cordonnier, Carlsbad, CA (US); Shariq Hussain, Vista, CA (US)

(73) Assignee: Carlsmed, Inc., Carlsbad, CA (US)

( * ) Notice: Subject to any disclaimer, the term of this patent is extended or adjusted under 35 U.S.C. 154(b) by 34 days.

(21) Appl. No.: 18/592,217

(22) Filed: Feb. 29, 2024

(65) Prior Publication Data
US 2024/0203551 A1 Jun. 20, 2024

Related U.S. Application Data

(63) Continuation of application No. PCT/US2022/042188, filed on Aug. 31, 2022, which
(Continued)

(51) Int. Cl.
*G16H 10/65* (2018.01)
*A61B 5/117* (2016.01)
(Continued)

(52) U.S. Cl.
CPC .............. *G16H 10/65* (2018.01); *A61B 5/117* (2013.01); *G06F 16/27* (2019.01);
(Continued)

(58) Field of Classification Search
CPC ........ G16H 10/65; G16H 40/20; G16H 40/67; G16H 50/30; G16H 10/60; G16H 15/00;
(Continued)

(56) References Cited

U.S. PATENT DOCUMENTS 4,704,686 A  11/1987 Aldinger
4,936,862 A   6/1990 Walker et al.
(Continued)

FOREIGN PATENT DOCUMENTS

CN 104318009 A 1/2015
CN 104353121 A 2/2015
(Continued)

OTHER PUBLICATIONS

Endo, Kenji et al. "Measurement of whole spine sagittal alignment using the SLOT radiography of the SONIALVISION safire series clinical application." Medical Now, No. 78; Aug. 2015, 4 pages.
(Continued)

*Primary Examiner* — Chinyere Mpamugo
(74) *Attorney, Agent, or Firm* — Perkins Coie LLP

(57) ABSTRACT

A medical implant can comprise a physical structure configured to secure the medical implant within a body of a patient, a proximity communication component physically coupled to the physical structure, and a memory operatively coupled to the proximity communication component. The memory can store a private key, wherein the memory is configured to provide the private key through the proximity communication component to an external device for enabling the external device to access one or more electronic medical records associated with a patient that is implanted with the implant from a distributed blockchain ledger of electronic medical records.

20 Claims, 9 Drawing Sheets

Related U.S. Application Data is a continuation of application No. 17/463,054, filed on Aug. 31, 2021, now abandoned.

(51) Int. Cl.
*G06F 16/27* (2019.01)
*G06F 21/62* (2013.01)
*G16H 40/20* (2018.01)
*G16H 40/67* (2018.01)
*G16H 50/30* (2018.01)
*H04L 9/00* (2022.01)
*H04L 9/32* (2006.01)

(52) U.S. Cl.
CPC ......... *G06F 21/6245* (2013.01); *G16H 40/20* (2018.01); *G16H 40/67* (2018.01); *G16H 50/30* (2018.01); *H04L 9/3239* (2013.01); *H04L 9/50* (2022.05)

(58) Field of Classification Search
CPC ... A61B 5/117; A61B 5/0031; A61B 2562/08; G06F 16/27; G06F 21/6245; G06F 21/645; H04L 9/3239; H04L 9/50; H04L 63/105; H04L 9/088; H04L 2209/88
See application file for complete search history.

(56) References Cited

U.S. PATENT DOCUMENTS

| | | |
|---|---|---|
| 5,431,562 A | 7/1995 | Andreiko et al. |
| 6,696,073 B2 | 2/2004 | Boyce et al. |
| 6,772,026 B2 | 8/2004 | Bradbury |
| 6,932,842 B1 | 8/2005 | Litschko et al. |
| 6,978,188 B1 | 12/2005 | Christensen |
| 6,988,241 B1 | 1/2006 | Guttman |
| 7,174,282 B2 | 2/2007 | Hollister et al. |
| 7,187,790 B2 | 3/2007 | Sabol et al. |
| D548,242 S | 8/2007 | Viegers |
| 7,747,305 B2 | 6/2010 | Dean et al. |
| 7,756,314 B2 | 7/2010 | Karau et al. |
| 7,799,077 B2 | 9/2010 | Lang |
| 8,246,680 B2 | 8/2012 | Betz |
| 8,265,949 B2 | 9/2012 | Haddad |
| 8,275,594 B2 | 9/2012 | Lin |
| 8,337,507 B2 | 12/2012 | Lang |
| 8,394,142 B2 | 3/2013 | Bertagnoli |
| 8,457,930 B2 | 6/2013 | Shroeder |
| 8,532,806 B1 | 9/2013 | Masson |
| 8,556,983 B2 | 10/2013 | Bojarski et al. |
| 8,644,568 B1 | 2/2014 | Hoffman |
| 8,735,773 B2 | 5/2014 | Lang |
| 8,758,357 B2 | 6/2014 | Frey |
| 8,775,133 B2 | 7/2014 | Schroeder |
| 8,781,557 B2 | 7/2014 | Dean |
| 8,843,229 B2 | 9/2014 | Vanasse |
| 8,855,389 B1 | 10/2014 | Hoffman |
| 8,870,889 B2 | 10/2014 | Frey |
| 9,020,788 B2 | 4/2015 | Lang |
| 9,198,678 B2 | 12/2015 | Frey et al. |
| 9,208,558 B2 | 12/2015 | Dean |
| D761,842 S | 7/2016 | Johnson |
| 9,411,939 B2 | 8/2016 | Furrer |
| 9,445,907 B2 | 9/2016 | Meridew |
| 9,452,050 B2 | 9/2016 | Miles et al. |
| 9,542,525 B2 | 1/2017 | Arisoy et al. |
| 9,642,633 B2 | 5/2017 | Frey et al. |
| 9,693,831 B2 | 7/2017 | Mosnier et al. |
| 9,707,058 B2 | 7/2017 | Bassett |
| 9,715,563 B1 | 7/2017 | Schroeder |
| 9,757,245 B2 | 9/2017 | O'Neil et al. |
| 9,775,680 B2 | 10/2017 | Bojarski et al. |
| 9,782,228 B2 | 10/2017 | Mosnier et al. |
| 9,993,341 B2 | 6/2018 | Vanasse |
| 10,034,676 B2 | 7/2018 | Donner |
| 10,089,413 B2 | 10/2018 | Wirx-Speetjens et al. |
| D841,675 S | 2/2019 | Hoffman |
| 10,213,311 B2 | 2/2019 | Mafhouz |
| D845,973 S | 4/2019 | Jaycobs |
| D845,974 S | 4/2019 | Cooperman |
| D847,165 S | 4/2019 | Kolbenheyer |
| D848,468 S | 5/2019 | Ng |
| D849,029 S | 5/2019 | Cooperman |
| D849,773 S | 5/2019 | Jiang |
| 10,292,770 B2 | 5/2019 | Ryan |
| 10,299,863 B2 | 5/2019 | Grbic et al. |
| 10,390,958 B2 | 8/2019 | Maclennan |
| D860,237 S | 9/2019 | Li |
| D860,238 S | 9/2019 | Bhardwaj |
| D867,379 S | 11/2019 | Ang |
| D867,389 S | 11/2019 | Jamison |
| 10,463,433 B2 | 11/2019 | Turner et al. |
| D870,762 S | 12/2019 | Mendoza |
| 10,512,546 B2 | 12/2019 | Kamer et al. |
| 10,517,681 B2 | 12/2019 | Roh et al. |
| D872,117 S | 1/2020 | Kobayashi |
| D872,756 S | 1/2020 | Howell |
| D874,490 S | 2/2020 | Dodsworth |
| D875,761 S | 2/2020 | Heffernan |
| D876,454 S | 2/2020 | Knowles |
| D877,167 S | 3/2020 | Knowles |
| D879,112 S | 3/2020 | Hejazi |
| 10,588,589 B2 | 3/2020 | Bregman-Amitai et al. |
| 10,603,055 B2 | 3/2020 | Donner et al. |
| D880,513 S | 4/2020 | Wang |
| D881,908 S | 4/2020 | Sunil |
| D881,910 S | 4/2020 | Lin |
| 10,621,289 B2 | 4/2020 | Schroeder |
| 10,631,988 B2 | 4/2020 | Arnold et al. |
| 10,646,236 B2 | 5/2020 | Donner et al. |
| 10,646,258 B2 | 5/2020 | Donner et al. |
| 10,736,698 B2 | 8/2020 | Bohl |
| 10,751,188 B2 | 8/2020 | Guo et al. |
| 10,806,597 B2 | 10/2020 | Sournac et al. |
| 10,902,944 B1 | 1/2021 | Casey et al. |
| 11,000,334 B1 | 5/2021 | Young |
| 11,083,586 B2 | 8/2021 | Cordonnier |
| 11,112,770 B2 | 9/2021 | Roh et al. |
| 11,166,764 B2 | 11/2021 | Roh et al. |
| 11,185,369 B2 | 11/2021 | Ryan |
| 11,376,076 B2 | 7/2022 | Casey et al. |
| 11,432,943 B2 | 9/2022 | Casey et al. |
| 11,439,514 B2 | 9/2022 | Casey et al. |
| 11,443,838 B1 | 9/2022 | Cordonnier |
| 11,984,205 B2 | 5/2024 | Cordonnier |
| 2005/0273170 A1 | 12/2005 | Navarro et al. |
| 2014/0072608 A1 | 3/2014 | Karagkiozaki |
| 2014/0074438 A1 | 3/2014 | Furrer |
| 2014/0081659 A1 | 3/2014 | Nawana et al. |
| 2014/0086780 A1 | 3/2014 | Miller |
| 2014/0164022 A1 | 6/2014 | Reed |
| 2014/0263674 A1 | 9/2014 | Cerveny |
| 2014/0350614 A1 | 11/2014 | Frey |
| 2015/0089590 A1 | 3/2015 | Krishnan et al. |
| 2015/0105891 A1 | 4/2015 | Golway et al. |
| 2015/0213225 A1 | 7/2015 | Amarasingham |
| 2015/0324490 A1 | 11/2015 | Page |
| 2015/0328004 A1 | 11/2015 | Mafhouz |
| 2016/0015465 A1 | 1/2016 | Steines et al. |
| 2016/0074048 A1 | 3/2016 | Pavlovskaia |
| 2016/0117817 A1 | 4/2016 | Seel |
| 2016/0143744 A1 | 5/2016 | Bojarski et al. |
| 2016/0210374 A1 | 7/2016 | Mosnier et al. |
| 2016/0217268 A1 | 7/2016 | Otto |
| 2016/0242857 A1 | 8/2016 | Scholl |
| 2016/0300026 A1 | 10/2016 | Bogoni et al. |
| 2016/0354039 A1 | 12/2016 | Soto et al. |
| 2016/0378919 A1 | 12/2016 | McNutt et al. |
| 2017/0000566 A1 | 1/2017 | Gordon |
| 2017/0014169 A1 | 1/2017 | Dean |
| 2017/0020679 A1 | 1/2017 | Maclennan |
| 2017/0035514 A1 | 2/2017 | Fox et al. |
| 2017/0061375 A1 | 3/2017 | Laster |
| 2017/0068792 A1 | 3/2017 | Reiner |

(56) References Cited

U.S. PATENT DOCUMENTS

| | | |
|---|---|---|
| 2017/0135706 A1 | 5/2017 | Frey et al. |
| 2017/0143494 A1 | 5/2017 | Mahfouz |
| 2017/0143831 A1 | 5/2017 | Varanasi et al. |
| 2017/0216047 A1 | 8/2017 | Hawkes et al. |
| 2017/0220740 A1 | 8/2017 | D'Urso |
| 2017/0252107 A1 | 9/2017 | Turner et al. |
| 2017/0262595 A1 | 9/2017 | Vorhis |
| 2017/0354510 A1 | 12/2017 | O'Neil et al. |
| 2017/0367645 A1 | 12/2017 | Klinder |
| 2018/0008349 A1 | 1/2018 | Gillman |
| 2018/0116727 A1 | 5/2018 | Caldwell et al. |
| 2018/0168499 A1 | 6/2018 | Bergold |
| 2018/0168731 A1 | 6/2018 | Reid |
| 2018/0185075 A1 | 7/2018 | She |
| 2018/0233222 A1 | 8/2018 | Daley |
| 2018/0233225 A1 | 8/2018 | Experton |
| 2018/0250075 A1 | 9/2018 | Cho |
| 2018/0303552 A1 | 10/2018 | Ryan |
| 2018/0303616 A1 | 10/2018 | Bhattacharyya et al. |
| 2018/0338841 A1 | 11/2018 | Miller et al. |
| 2019/0065685 A1 | 2/2019 | Pickover |
| 2019/0201106 A1 | 7/2019 | Siemionow |
| 2019/0262084 A1 | 8/2019 | Roh et al. |
| 2019/0266597 A1 | 8/2019 | Mohtar |
| 2019/0328929 A1 | 10/2019 | Kugler et al. |
| 2019/0354693 A1 | 11/2019 | Yoon |
| 2019/0380792 A1 | 12/2019 | Poltaretskyi et al. |
| 2020/0021570 A1 | 1/2020 | Lin |
| 2020/0078180 A1 | 3/2020 | Casey et al. |
| 2020/0085509 A1 | 3/2020 | Roh et al. |
| 2020/0170802 A1 | 6/2020 | Casey et al. |
| 2020/0258605 A1 | 8/2020 | Blechman |
| 2020/0289288 A1 | 9/2020 | Müller et al. |
| 2020/0315708 A1 | 10/2020 | Mosnier et al. |
| 2020/0351094 A1 | 11/2020 | Canterbury et al. |
| 2021/0059822 A1 | 3/2021 | Casey et al. |
| 2021/0064605 A1* | 3/2021 | Bálint .................. H04W 12/35 |
| 2021/0210189 A1 | 7/2021 | Casey et al. |
| 2021/0287770 A1 | 9/2021 | Anderson |
| 2021/0342909 A1 | 11/2021 | Ketchell, III |
| 2021/0382457 A1 | 12/2021 | Roh et al. |
| 2021/0391040 A1 | 12/2021 | Dormer et al. |
| 2021/0393415 A1* | 12/2021 | Dewey .................. A61F 2/3094 |
| 2022/0000625 A1 | 1/2022 | Cordonnier |
| 2022/0006642 A1 | 1/2022 | Maj et al. |
| 2022/0039965 A1 | 2/2022 | Casey et al. |
| 2022/0047402 A1 | 2/2022 | Casey et al. |
| 2023/0067537 A1 | 3/2023 | Casey et al. |
| 2024/0087696 A1 | 3/2024 | Cordonnier |

FOREIGN PATENT DOCUMENTS

| | | |
|---|---|---|
| CN | 204468348 U | 7/2015 |
| CN | 105796214 A | 7/2016 |
| CN | 106202861 | 12/2016 |
| CN | 107220933 | 9/2017 |
| CN | 108670506 A | 10/2018 |
| CN | 110418338 A | 11/2019 |
| CN | 110575289 A | 12/2019 |
| CN | 111281613 A | 6/2020 |
| CN | 112155792 A | 1/2021 |
| CN | 113643790 | 11/2021 |
| EP | 3120796 A1 | 1/2017 |
| WO | 9507509 A1 | 3/1995 |
| WO | 2004110309 A2 | 12/2004 |
| WO | 2010151564 A1 | 12/2010 |
| WO | 2012154534 A1 | 11/2012 |
| WO | 2014180972 A2 | 11/2014 |
| WO | 2016172694 A1 | 10/2016 |
| WO | 2017116346 A1 | 7/2017 |
| WO | 2019112917 A1 | 6/2019 |
| WO | 2019148154 A1 | 8/2019 |
| WO | 2019165152 A1 | 8/2019 |
| WO | 2019241167 A1 | 12/2019 |
| WO | 2020055874 A1 | 3/2020 |
| WO | 2022045956 A1 | 3/2022 |
| WO | 2023034405 A1 | 3/2023 |

OTHER PUBLICATIONS

International Search Report and Written Opinion for International Application No. PCT/US22/42188, mailed Dec. 29, 2022, 19 pages.
International Search Report and Written Opinion for International Application No. PCT/US23/13653, mailed Jul. 21, 2023, 9 pages.
Materialise Mimics, "Efficiently turn scans into accurate virtual 3D models," Retrieved on Nov. 1, 2019 at www.materialize.com/en/medical/software/mimics, 1 page.
Pimenta, Dr. Luiz, "Current Surgical Strategies to Restore Proper Sagittal Alignment," Journal of Spine 2015, vol. 4, Issue 4, 2 pages.
Extended European Search Report for European Application No. 22865499.2; Date of Mailing: May 26, 2025; 10 pages.
Gibson, et al., "Protect Your Pacemaker: Blockchain based Authentication and Consented Authorization for Implanted Medical Devices", Procedia Computer Science, Elsevier, Amsterdam, NL, vol. 171, Jan. 1, 2020 (Jan. 1, 2020), pp. 847-856.

* cited by examiner

US 12,537,081 B2

INTER VERTEBRAL CAGE WITH INTEGRATED TRANSMITTER

CROSS-REFERENCE TO RELATED APPLICATIONS

The present application is a continuation of International Patent Application No. PCT/US22/42188, filed Aug. 31, 2022, which is a continuation of and claims priority to U.S. patent application Ser. No. 17/463,054, filed Aug. 31, 2021, the disclosure of which are incorporated by reference herein in their entireties.

BACKGROUND

Blockchain technology is used to transfer assets using tokens generated as part of a blockchain encryption process. An asset (e.g., an electronic coin, a blockchain-based good, a personal identifier, and so on) is represented by a chain of transactions that transfers ownership from one party to another party. To transfer ownership of an asset on a blockchain, a new transaction is generated and added to a stack of transactions in a block. The new transaction, which includes the public key of the new owner, is digitally signed by the owner with the owner's private key to transfer ownership to the new owner as represented by the new owner public key. Once the block is full, the block is "capped" with a block header that is a hash digest of all the transaction identifiers within the block. The block header is recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the asset. The blockchain creates a mathematical proof of ownership in an entity represented by a security identity (e.g., a public key), which can be pseudo-anonymous.

The blockchain technology can maintain a distributed ledger of transactions. With a distributed ledger, a ledger of all the transactions for an asset is stored redundantly at multiple nodes (i.e., computers) of a blockchain network. The ledger at each node is stored as a blockchain. In a blockchain, the transactions are stored in the order that the transactions are received by the nodes. Each node in the blockchain network has a complete replica of the entire blockchain. The blockchain system also implements techniques to ensure that each node will store the identical blockchain, even though nodes can receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The blockchain system also implements techniques to ensure that it would be infeasible to change a transaction and regenerate the blockchain by employing a computationally expensive technique to generate a nonce that is added to the block when it is created. A blockchain ledger is sometimes referred to as an Unspent Transaction Output ("UXTO") set because it tracks the output of all transactions that have not yet been spent.

DETAILED DESCRIPTION

Figure 1A:
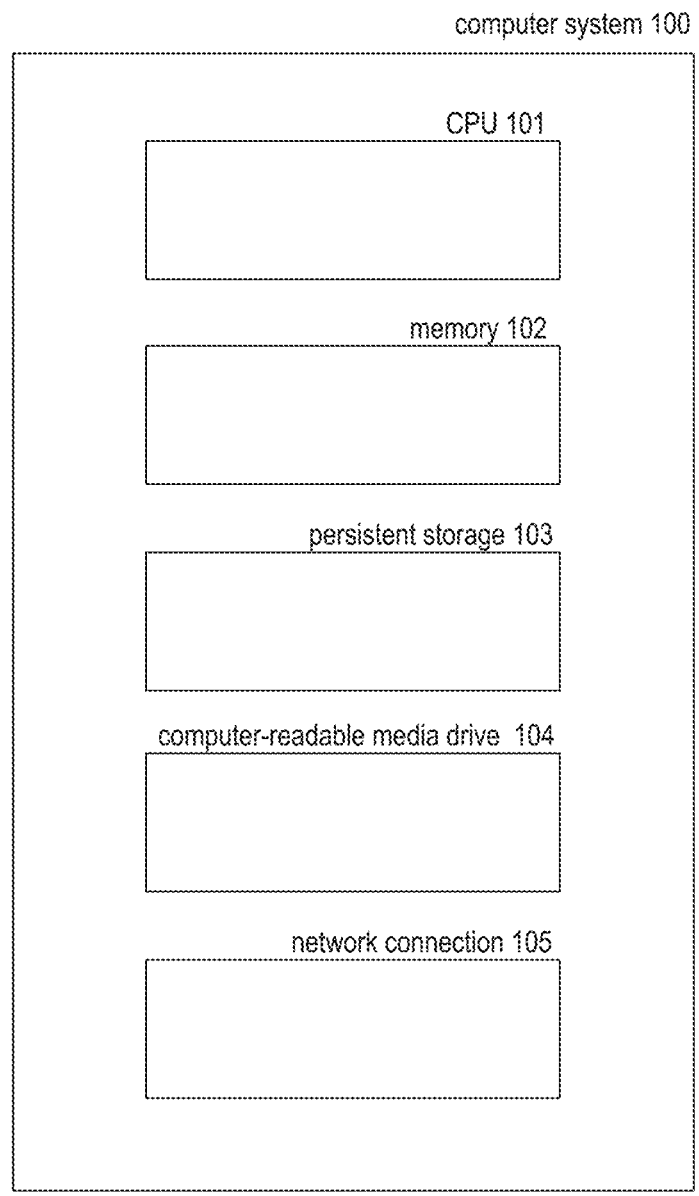
FIG. 1A is a block diagram showing some of the components typically incorporated in at least some of the computer systems and other devices on which the disclosed system operates.

Blockchain technology can be used to generate an identity token for a physical or digital asset using a cryptographic one-way hash of information that uniquely identifies the asset. Tokens also have an owner that uses an additional public/private key pair. The owner public key is set as the token owner identity and when performing actions against tokens, ownership proof is established by providing a signature generated by the owner private key and validated against the public key listed as the owner of the token. This allows transactions of digital assets, such as records associated with owners of unique tokens, to be accurately tracked using blockchain transactions.

The blockchain technology can maintain a distributed ledger of transactions and generate an identity token for a physical or digital asset using a cryptographic one-way hash of information that uniquely identifies the asset. Tokens also have an owner that uses an additional public/private key pair. The owner public key is set as the token owner identity and when performing actions against tokens, ownership proof is established by providing a signature generated by the owner private key and validated against the public key listed as the owner of the token. A person can be uniquely identified, for example, using a combination of a user name, social security number, and biometric information (e.g., fingerprint). A product (e.g., refrigerator) can be uniquely identified, for example, using the name of its manufacturer and its seral number. The identity tokens for each would be a cryptographic one-way hash of such combinations. The identity token for an entity (e.g., person or company) can be the public key of a public/private key pair, where the private key is held by the entity. Identity tokens can be used to identify people, institutions, commodities, contracts, computer code, equities, derivatives, bonds, insurance, loans, documents, and so on. Identity tokens can also be used to identify collections of assets. An identity token for a collection can be a cryptographic one-way hash of the digital tokens of the assets in the collection. The creation of an identity token for an asset in a blockchain establishes provenance of the asset, and the identity token can be used in transactions (e.g., buying, selling, insuring) of the asset stored in a blockchain, creating a full audit trail of the transactions.

To record a simple transaction in a blockchain, each party and asset involved with the transaction needs an account that is identified by a digital token. For example, when one person wants to transfer a car to another person, the current owner and next owner create accounts, and the current owner also creates an account that is uniquely identified by its vehicle identification number. The account for the car identifies the current owner. The current owner creates a transaction against the account for the car that indicates that the transaction is a transfer of ownership, indicates the public keys (i.e., identity tokens) of the current owner and the next owner, and indicates the identity token of the car. The transaction is signed by the private key of the current owner and the transaction is evidence that the next owner is now the current owner.

In order to limit the visibility of the data on a blockchain, a private blockchain can be employed. A private blockchain acts as a state channel where several parties can share contract states without writing to the main network blockchain. A governance contract is deployed to the private chain for one or more users with governing roles to manage membership and permissions to update state on the private chain. The private blockchain can manage electronic medical records with manage permissions.

For example, electronic medical records ("EMR" or "EMRs") can be tracked for patients using blockchain transactions. As patients undergo medical procedures, each medical procedure can be recorded as a "transaction" for a blockchain associated with the patient's EMR. Each procedure can include information about the procedure, such as procedure type, date of procedure, outcome of procedure, follow-up actions for the procedure, data associated with the procedure, and/or other information associated with the procedure. New patient data can also be recorded as a transaction.

In order to comply with the Health Insurance Portability and Accountability Act ("HIPAA"), medical records for patients must be kept confidential unless the patient consents to sharing the medical records. While blockchains can be kept private, most blockchains are in the public space so that transactions in the ledger associated with the blockchain can be verified. In order to keep medical records confidential for patients but maintain a ledger of medical procedures as transactions for the patients, a medical implant with computing components, such as persistent memory, can be used to store medical records associated with treatment of the patient, ledger information, and/or a private key for accessing private medical records stored in a blockchain ledger. When the patient wishes to share EMRs with treatment providers, the patient can provide a key unique to the patient's implant chip to the treatment provider, which allows the treatment provider to access the ledger of medical procedures, patient data (e.g., medical history, physician notes, medical images, and scans), surgical plans, healthcare provider information, implant data, and other relevant medical data from the implant itself or from the private ledger that requires the key to access. In some embodiments, the patient can set permissions for access to, for example, selected portion(s) of EMRs.

In some embodiments, the present technology includes systems and methods for storing, managing, and accessing healthcare data in a distributed ledger (e.g., public ledger) and/or blockchain managed digital filing cabinets. For example, in many embodiments, the present technology is directed to providing healthcare data associated with an implant, such as a patient-specific implant. The system can receive and store patient healthcare data from a source (e.g., wearable device, user device, blockchain device, implant, healthcare provider device, etc.). The system can manage access to the healthcare data based on authentication levels. The authentication levels can include, without limitation, authenticating a user based on geolocation, biometric data, blockchain, tokens (e.g., non-fungible tokens), or any authentication method. The system can convert the patient healthcare data into a token, such as a non-fungible token. Based on the determined authentication level of the user requesting access to the healthcare data on the implant, the system can permit the user to access some or all of the healthcare data. The system can include one or more healthcare digital filing cabinets that store healthcare data, patient information, electronic medical records, and/or additional patient related information. In some embodiments, systems can share data (e.g., healthcare data, patient information, electronic medical records, and/or additional patient related information) via a network without using digital filing cabinets. The digital filing cabinets can be configured to manage a variety of blockchain transactions.

A user can approve family members, physicians, healthcare providers, or other users to access selected data, types of data, data associated with the procedure, data associated with the user, or the like. The digital filing cabinet can contain, for example, surgical plans, implant data, health records, medical insurance information, digital wallets, and other healthcare data. In some implementations, the digital filing cabinet can automatically update the healthcare data based on received data. In some implementations, the digital filing cabinet can automatically receive data from user devices, such as wearable devices, smartphones, non-fungible tokens, or other devices capable of collecting biometrics of the user. The user's digital filing cabinet can link one or more accounts to provide communication between the accounts. For example, the accounts can be healthcare provider accounts, family member accounts, insurance provider accounts, government entity accounts, or other accounts that allow the digital filing cabinet to request and receive data. The user can manage third-party access (e.g., viewing only, editing, annotation, etc.) of the stored data within a token (e.g., containerized NFTs), token-linked data (e.g., data linked to NFTs), etc. This allows the user to authorize, for example, a physician access to view data collected in real-time or almost real-time. The physician can provide real-time or almost real-time feedback to the patient via the digital filing cabinet. The patient can use the digital filing cabinet or a patient account to, for example, review physician feedback, a diagnosis, a treatment plan (e.g., a surgical plan, interventional plan, therapy plan, etc.), predicted treatment outcomes, cost estimates, insurance information, or the like.

The data management system can lock digital filing cabinets in response to failed authorization attempts, notify users of potential fraudsters, fraudulent activity, etc. The data management system can analyze collected data to generate post-treatment plans. In some embodiments, the data managing system can use one or more models to analyze post-operative collected data to generate or modify post-treatment plans, such as therapy plans, new surgical plans, etc. Post-operative analytics can be stored in digital filing cabinets or other databases. This allows the data management system to periodically or continuously analyze data from different data sources to provide patient-specific healthcare. The data management system can select a model (e.g., a machine learning model) selected based on the available data. If new data comes available, the data management system can identify one or more models suitable for analyzing the newly available data. This allows the data management system to adaptively select machine learning models to enhance analytics. The data sources can include, without limitation, diagnostic equipment (e.g., imaging equipment), patient wearables, hospital diagnostic equipment, etc.

In some embodiments, a healthcare management system includes digital filing cabinets that integrate data from, for example, digital wallets, one or more devices associated with the user, or data sources associated with a physician/healthcare provider. The healthcare management system can generate post-operative analytics based on post-operative data, such as new scans of the patient, diagnostic data, new patient medical records, or the like can be used. The healthcare management system can manage authentication, patient wallets, and/or digital filing cabinets via, for example, automated settings, privacy management, updated record management, etc.

In some embodiments, point of care devices can be integrated with a healthcare management system. Data from the point of care devices can be automatically transmitted to the patient's digital filing cabinet. This allows patients to access the digital filing cabinets (e.g., implant manufacture managed digital filing cabinets, healthcare provider managed digital filing cabinets, etc.) and view and/or manage data in real-time or almost real-time.

FIG. 1A is a block diagram showing some of the components typically incorporated in at least some of the computer systems and other devices on which the disclosed system operates. In various embodiments, these computer systems and other devices 100 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various embodiments, the computer systems and devices include zero or more of each of the following: a central processing unit (CPU) 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; computer-readable media drives 104 that are tangible storage means that do not include a transitory, propagating signal, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 1B:
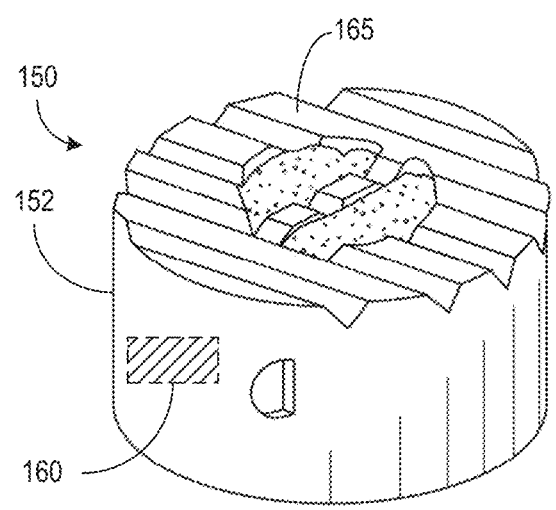
FIG. 1B is a diagram illustrating an example medical implant in accordance with embodiments of the technology.

FIG. 1B illustrates an example medical implant 150 according to some embodiments of the invention. The medical implant 150 can be an intervertebral device that includes a body 152 configured to interface with one or more identified anatomical structures (e.g., one or more vertebral bodies or endplates) at and/or proximate the target implantation site (e.g., between one or more vertebral bodies or endplates). The implant body 152 can include one or more structural features designed to engage one or more identified anatomical structures. For example, in the illustrated embodiment, the implant 150 can include an upper surface 165 and a lower surface (not shown) configured to seat against vertebral bodies of spine. In some embodiments, the upper surface 165 and the lower surface can have contours that match contours of the vertebral endplates, such that the upper surface 165 and lower surface "mate" with the corresponding vertebral endplates they engage with. The dimensions, contours, topology, composition, and/or other implant data can be part of the EMR. In some embodiments, such as the illustrated embodiment, the upper surface 165 and/or the lower surface can be textured (e.g., via roughenings, knurlings, ridges, and the like). Texturing data can be part of manufacturing data stored in the EMRs. For lordotic correction, the upper surface 165 and the lower surface may be angled with respect to one another, and the EMR can include the angle and sizes of these surfaces.

In some embodiments, the implant 150 can be an interspinous spacer with structural features in the form of U-shaped portions designed to receive respective spinous processes. The dimensions of the U-shaped portions can match the dimensions of the spinous processes. In other embodiments, the structural features can include recesses, arms, or other contact features designed to engage (e.g., contact, receive, etc.) one or more anatomical features (e.g., tissue, bony structures, etc.). The EMR can include the implant configuration, features, implantation procedure/plan, and/or intended use.

A user (e.g., a physician, health care provider, etc.) can access EMRs using a retrieval feature 160. For example, in embodiments in which a retrieval feature 160 is a bar code corresponding to the unique identifier, the user can scan the retrieval feature 160 using, for example, one or more cameras on the computing device and/or otherwise input the unique identifier into the computing device. Once the unique identifier is inputted into the computing system, the computing system can send the unique identifier to a remote server (e.g., via a communication network) with a request to provide the corresponding patient-specific surgical data set. In response to the request, and as described above, the server can locate the specific data set associated with the unique identifier and transmit the data set to the computing device for display to the user. The implant 150 can include other features assisting with accessing the ledger and viewing the EMRs.

Additional implant types, configurations, and structural features suitable for engaging identified anatomical features are described, for example, in U.S. application Ser. No. 16/207,116, filed Dec. 1, 2018, and U.S. application Ser. No. 16/987,113, filed Aug. 6, 2020, the disclosures of which are incorporated by reference herein in their entireties. For example, the medical implants can be pedicle screws, patient-specific implants, interbody implant systems, artificial discs, expandable intervertebral implants, sacroiliac implants, plates, arthroplasty devices for orthopedic joints, non-structural implants, or other devices disclosed in the patents and applications incorporated herein by reference.

The medical implant 150 is used to track and monitor medical data associated with the patient. U.S. Application No. 63/218,190 discloses implants capable of collecting data, assigning weighting/values, and communicating with other devices. The monitoring can be used with prescriptive systems, such as the systems disclosed in U.S. Pat. No. 10,902,944 and U.S. application Ser. No. 17/342,439, which are incorporated by reference in their entireties. For example, the patient's data can be incorporated into one or more training sets for a machine learning system or other systems disclosed in the incorporated by reference patents and applications.

The medical implant 150 can also be a multipurpose implant, providing both structure to address a medical issue in the body of the patient while also carrying information regarding the patient. For example, the medical implant 150 can be a pacemaker, a plate or pin to correctly position a previously broken bone or set of bones, and the like.

The retrieval feature 160 can be used to carry patient data, such as a private key for unlocking patient medical records stored on a blockchain ledger. In some implementations, the medical implant 150 also contains a private blockchain ledger for tracking EMRs associated with the patient. As the patient undergoes various treatments, new EMRs and updates to existing EMRs for the patient are generated and stored as "transactions" in a blockchain ledger. To access the EMRs associated with the patient, the private key from the medical implant 150 must be used to "unlock" the EMRs stored in the blockchain ledger. The patient can provide this private key to health care providers and other interested parties by a secure platform, mobile application, digital key, or the like. In some embodiments, the EMRs are encrypted using an encryption key that the health care provider decrypts. Additionally or alternatively, re-keying protocols, certification management protocols (e.g., enrollment certification protocol, transaction certification protocol, etc.), and other protocols and can be utilized for variable access and permissions. The patient can manage the data of the EMR to share selected data only. For example, the patient can a keep section of the EMR private while sharing another section of the EMR. The system also allows for user-controlled settings, such as settings for minors, family members, relatives, and/or other user-controlled settings.

An EMR can include patient data associated with the implant design and design process. If the implant is an artificial disc, for example, the stored data can include kinematic data (e.g., pre-operative patient data, target kinematic data, etc.), manufacturing data, design parameters, target service life data, physician recommendations/notes, etc. The disc can include an articulating implant body with plates contoured to match vertebral endplates, custom articulating members between the plates for providing patient-specific motion, etc. If the implant is an intervertebral cage, the stored data can include materials specifications of the implant body, dimensions of the implant body, manufacturing data, design parameters, target service life data, physician recommendations/notes, etc. The applications and patents incorporated by reference disclose data (e.g., surgical plans, implant specifications, data sets, etc.) that can be associated with the retrieval feature 160.

In some implementations, the patient can set variable permissions for access to transactions and details stored in the blockchain ledger. For example, particular medical providers may only be given access to certain transactions related to particular kinds of medical procedures. In other implementations, permissions can be set based on the patient, such as having child settings for children with an implant.

The medical implant 150 can also track and monitor various health related data for the patient. For example, the medical implant 150 can include one or more sensors configured to measure pressures, loads, or forces applied by anatomical elements to monitor, for example, activity, loading, etc. The medical implant 150 can continuously or periodically collect data indicating activity level, activities performed, disease progression, or the like. For example, loading across the implant 150 can be tracked over period of time. The applications and patents incorporated by reference disclose techniques for monitoring, collecting data, and transmitting data. In some embodiments, the medical implant 150 can identify events, such as excess loading, imbalance of the spine, or the like. In some embodiments, the patient is monitored with automatic blockchain updating based on activity (e.g., surgical procedure, change in status, etc.), disability (e.g., new disability, progression of disability, etc.), and/or healthcare events. The health care events can include imaging, diagnosis, treatment, and/or outcomes and event data that can be encoded in the blockchain. Collected data can be used as historical patient data used to treat another patient. The applications and patents incorporated by reference also disclose usage of historical data, imaging data, surgical plans, simulations, modeled outcomes, treatment protocols, and outcome values that can be encoded in the blockchain.

In some implementations, two or more implants can be used. For example, a patient can have both a spinal implant with an encoded chip containing the private key and/or the private blockchain ledger containing the EMRs of the patient and a subcutaneous digital implant. The subcutaneous digital implant acts as an intermediary device, communicating with both the spinal implant containing the private key and/or the private blockchain ledger and an external computing device, such as a patient treatment computing system. The subcutaneous digital implant may also include data of its own, such as patient identifying information, biometric data, and the like. In some embodiments, the subcutaneous digital implant may include the private key and/or the private blockchain ledger containing the EMRs of the patient.

Figure 2:
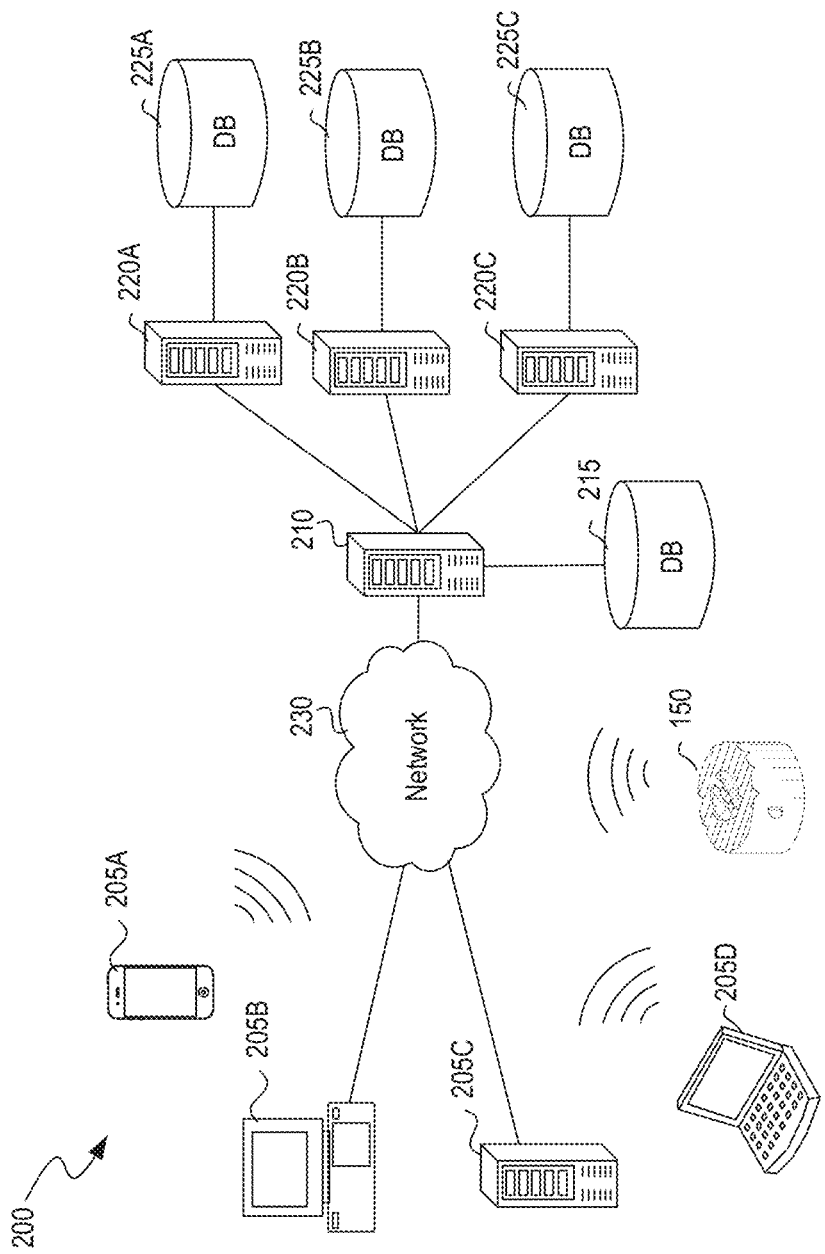
FIG. 2 is a system diagram illustrating an example of a computing environment in which the disclosed system operates in some embodiments.

FIG. 2 is a system diagram illustrating an example of a computing environment in which the disclosed system operates in some embodiments. In some embodiments, environment 200 includes one or more client computing devices 205A-D, examples of which can host the system 100. Client computing devices 205 operate in a networked environment using logical connections through network 230 to one or more remote computers, such as a server computing device. In some implementations, the client computing devices 205 can also include a medical implant, such as the medical implant 150 described above in relation to FIG. 1B.

In some embodiments, server 210 is an edge server which receives client requests and coordinates fulfillment of those requests through other servers, such as servers 220A-C. In some embodiments, server computing devices 210 and 220 comprise computing systems, such as the system 100. Though each server computing device 210 and 220 is displayed logically as a single server, server computing devices can each be a distributed computing environment encompassing multiple computing devices located at the same or at geographically disparate physical locations. In some embodiments, each server 220 corresponds to a group of servers.

Client computing devices 205 and server computing devices 210 and 220 can each act as a server or client to other server or client devices. In some embodiments, servers (210, 220A-C) connect to a corresponding database (215, 225A-C). As discussed above, each server 220 can correspond to a group of servers, and each of these servers can share a database or can have its own database. Databases 215 and 225 warehouse (e.g., store) information such as biometric information of users, blockchain transactions involving user medical records, and other data. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. In some embodiments, network 230 is the Internet or some other public or private network. Client computing devices 205 are connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
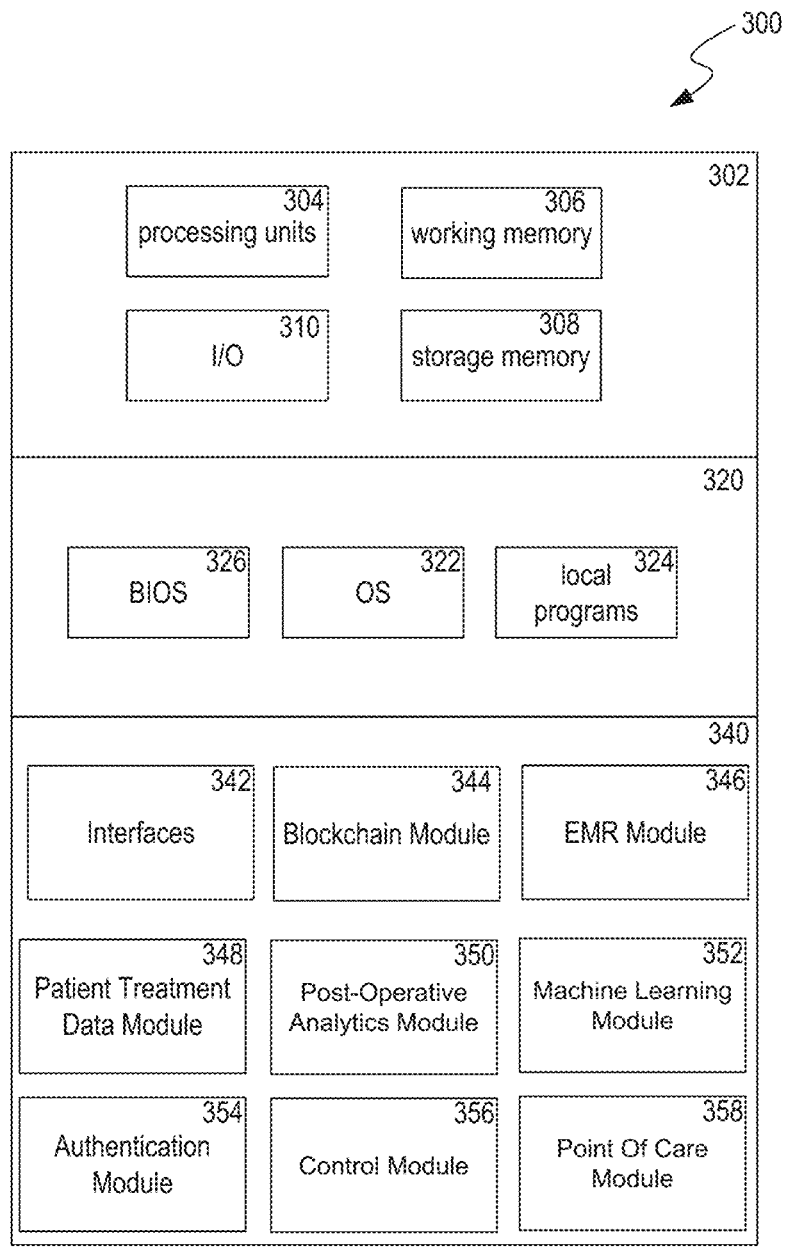
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include a blockchain module 344, EMR module 346, patient treatment data module 348, post-operative analytics module 350, machine learning module 352, authentication module 354, control module 356, point of care module 358, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Blockchain module 344 provides blockchain functionality for the system. The blockchain module 344 allows for the creation of a new block for a new/existing blockchain distributed ledger, hashing of the new block, and addition of the new block to the patient's private blockchain and distributed ledger. The blockchain module 344 can manage a plurality of public blockchains, private blockchains, and/or other distributed ledgers for patients. In some implementations, the privacy of each patient's blockchain(s) can be ensured because each patient maintains an individual blockchain and/or ledger for the patient's medical records and data. In other implementations, transactions include a public key that matches a private key associated with the patient. In these implementations, while the transactions are added to a public ledger, details of the transactions can only be accessed when the private key is used, ensuring patient data privacy.

New blocks for blockchains and/or ledgers are based on received EMRs from the EMR module 346. In some implementations, the created blockchain ledger(s) can be stored in persistent memory of an implant of the patient. In other implementations, the created blockchain ledger(s) can be stored in memory associated with the system and may be a private blockchain ledger associated exclusively with the patient or a public blockchain ledger associated with a group of patients. If the blockchain ledger is a public ledger, each block can be associated with different patients, but cannot be accessed for viewing unless a medical professional possesses a private key associated with the patient identified in a particular block in the ledger. Groups of patients can be subdivided in multiple ways. For example, a group of patients can be defined as all patients at a particular medical facility, all patients under the treatment of a particular medical professional, all patients covered by a particular medical insurance provider, all patients with a similar pathology, treatment, outcome, and the like.

EMR module 346 maintains patient electronic medical records. The EMRs can include patient data (e.g., images, scans, etc.), demographic information about the patient, identifying information of the patient, historical patient treatment data, metrics, plans (e.g., pre-operative plans, corrective plans, surgical plans, post-operative plans, etc.), data providing pathology-related information, provider information (e.g., physician, hospital, surgical team, etc.), patient feedback (e.g., feedback acquired using quality of life questionnaires, surveys, patient-reported outcome measures, etc.), vital signs, diagnostic results, and/or other medically relevant information about the patient, such as family history of various illnesses or medical problems, prescription drug history, and the like. EMR module 346 can also maintain patient treatment records, such as medical procedures undergone, implant information (e.g., patient-specific design, composition, implantation date, manufacture, etc.), drug therapies performed, clinical trials participated in, and other relevant medical actions taken on behalf of the health of the patient. Each medical action can also include various additional data points, such as attending physician, prescribing physician, time and date of action, patient medical reaction medical action taken, and other relevant medical data points. In some implementations, EMRs can also include various relevant images and scans (e.g., CT scans, 3D CT scans, CMCT scans, MRIs, PET scans, etc.), images (e.g., X-ray images, magnetic resonance imaging, ultrasound images, etc.) associated with medical actions, such as medical images, blood test results, and the like. The EMR module 346 can provide EMRs to the blockchain module 344 for generating transactions based on the EMRs.

Patient treatment data module 348 gathers patient data regarding a medical event or medical action (e.g., a hospitalization, a medical procedure, a drug therapy regime, and the like) from various medical systems. In one example, patient treatment data module 348 can receive identifying information identifying a patient, a result from a routine physician visit, and any relevant data associated with the visit, such as various medical images taken, blood pressure values, heart rate, blood oxygen levels, body mass index, and/or other medical data. The patient treatment data module 348 can provide this data in an EMR to the EMR module 346 to create new EMRs for patients.

Post-operative analytics module 350 collects and analyses patient information, patient goals, healthcare provider goals for a patient, outcomes of a medical procedure, health metric goals (e.g., BMI, blood pressure, etc.), healthcare provider notes from procedures or patient exams, etc. For example, after a medical procedure, the post-operative analytics module 350 analyzed x-ray images to determine whether the medical procedure was successful. The post-operative analytics module 350 can determine whether the patient should attend physical therapy based on collected health metrics, such as patient mobility (e.g., range of motion of limbs or fingers). The post-operative analytics module 350 can identify EMRs that a healthcare provider should review, such as new spots in an MRI which can indicate cancer. In some implementations, the post-operative analytics are converted to a token.

Machine learning module 352 may be configured to analyze user healthcare data in a digital filing cabinet to determine to notify the events (e.g., emergencies, appointments, health goals, etc.). The machine learning module 352 may be configured to analyze healthcare data based on at least one machine-learning algorithm trained on at least one dataset reflecting a user's healthcare information, goals, and health status. The at least one machine-learning algorithms (and models) may be stored locally at databases and/or externally at databases (e.g., cloud databases and/or cloud servers). Client devices may be equipped to access these machine learning algorithms and intelligently analyze healthcare data and notify a user based on at least one machine learning model that is trained on a user's historical healthcare data. For example, if a user frequently has increased blood sugar levels, the user's health metrics may be collected to train a machine learning model to then automatically notify the user to exercise to help lower the user's blood sugar.

As described herein, a machine-learning (ML) model may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning, a neural network, or the like. In examples, the ML models may be located on the client device, service device, a network appliance (e.g., a firewall, a router, etc.), or some combination thereof. The ML models may process user healthcare data and other data stores of user health metrics to determine when to generate a notification for a user. Based on an aggregation of data from a user's healthcare digital filing cabinet, wearable devices, and other user data stores, at least one ML model may be trained and subsequently deployed to automatically generate healthcare notifications. The trained ML model may be deployed to one or more devices. As a specific example, an instance of a trained ML model may be deployed to a server device and to a client device. The ML model deployed to a server device may be configured to be used by the client device when, for example, the client device is connected to the Internet. Conversely, the ML model deployed to a client device may be configured to be used by the client device when, for example, the client device is not connected to the Internet. In some instances, a client device may not be connected to the Internet but still configured to receive satellite signals with healthcare data. In such examples, the ML model may be locally cached by the client device. In some implementations, the machine learning module 352 identifies new healthcare data in the digital filing cabinet and updates the health goals or metrics of the patient based on the new healthcare data.

Authentication module 354 provides authentication management of patient-specific healthcare data to users (e.g., patients, family members, healthcare providers, approved users, etc.). Authentication module 354 can manage the access (e.g., read-only, editing capability, privacy protecting, etc.) to the healthcare data based on geolocation, biometrics, blockchain, token (e.g., NFT), or key functionality for user authentication. Authentication module 354 provides token functionality for user authentication to access the healthcare data. Authentication module 354 can generate a token for the user to access medical records. In some implementations, the token is valid for a threshold of time during which the user can access the medical records. A user can request and receive a token from the authentication module 354. In some implementations, authentication module 354 provides key functionality for user authentication to access the healthcare data. The authentication module 354 can share an authentication key (e.g., symmetric or asymmetric key) with the user over a secure channel for the user to access the healthcare data during the time of authentication.

Authentication module 354 provides biometric functionality for user authentication to access the healthcare data. A user can provide their biometric information (e.g., voice, facial scan, fingerprint, iris scanning, dental records, height, weight, etc.) to the authentication module 354. The authentication module 354 can store the biometric information. When the user attempts to access the healthcare data, the authentication module 354 can verify the identity of the user based on the biometric information before granting the user access to medical records. In some cases, the authentication module 354 requires the user to provide two or more types of biometric information, such as a fingerprint and voice, before granting the user access to the medical records.

Authentication module 354 provides geolocation functionality for user authentication to access the healthcare data. Authentication module 354 can verify the location of the user device attempting to access the healthcare data or the location of a patient's device, when determining to permit a user to access healthcare data. In an example, a healthcare provider can only access a patient's medical records at a healthcare facility. In another example, a healthcare provider can only access the patient's medical records when the patient is at the healthcare facility of the healthcare provider.

Authentication module 354 provides blockchain functionality for user authentication to access the healthcare data. The authentication module 354 allows for the creation of a new block for a new/existing blockchain distributed ledger, hashing of the new block, and addition of the new block to the patient's private blockchain and distributed ledger. The authentication module 354 can manage a plurality of public blockchains, private blockchains, and/or other distributed ledgers for patients. In some implementations, the privacy of each patient's blockchain(s) can be ensured because each patient maintains an individual blockchain and/or ledger for the patient's medical records and data. In other implementations, transactions include a public key that matches a private key associated with the patient. In these implementations, while the transactions are added to a public ledger, details of the transactions can only be accessed when the private key is used, ensuring patient data privacy.

New blocks for blockchains and/or ledgers are based on received healthcare data. In some implementations, the created blockchain ledger(s) can be stored in persistent memory of an implant of the patient. In other implementations, the created blockchain ledger(s) can be stored in memory associated with the system and may be a private blockchain ledger associated exclusively with the patient or a public blockchain ledger associated with a group of patients. If the blockchain ledger is a public ledger, each block can be associated with different patients, but cannot be accessed for viewing unless a medical professional possesses a private key associated with the patient identified in a particular block in the ledger. Groups of patients can be subdivided in multiple ways. For example, a group of patients can be defined as all patients at a particular medical facility, all patients under the treatment of a particular medical professional, all patients covered by a particular medical insurance provider, all patients with a similar pathology, treatment, outcome, and the like.

Control module 356 controls the patient healthcare data in the healthcare provider digital filing cabinet. The control module 356 can determine automated settings for searching, periodically or continually, for additional data to add to the digital filing cabinet. Control module 356 can manage the privacy of the healthcare data by requiring authentication credentials (as described in authentication module 354) of any user attempting to access the patient healthcare data. In some implementations, the control module 356 encrypts the patient healthcare data. Control module 356 can identify new healthcare data and update the digital filing cabinet of the healthcare provider to include the new healthcare data.

Point of care (POC) module 358 identifies POC devices, such as healthcare provider devices (e.g., medical instruments, charting devices, patient monitoring devices, etc.) or patient devices (e.g., wearable devices, implants, smartphones, etc.) and retrieves collected data from POC devices. The POC module 358 can collect health history data, treatment data, health metrics of the patient, the geolocation of the patient, insurance information, biometric data, or payment information from the POC devices. The POC module 358 can display versions of the health data on a user device for a healthcare provider to show a patient. For example, the POC module 358 displays x-ray images on a user interface so the patient can see an implant after a surgery procedure. POC module 358 provides alerts based on events identified from healthcare data inputted into a digital filing cabinet. For example, the alerts are user (e.g., physician, Doctor, patient etc.) notifications from monitoring data collected from wearable devices. The POC module 358 can generate an alert to request additional or updated patient information, scheduling appointments, notifying of emergencies, etc. For example, the POC module 358 can generate an alert when the patient's health metrics (e.g., heart rate, blood pressure, body temperature, etc.) are outside of healthy metric threshold (e.g., a threshold or range determined by a healthcare provider).

Figure 4:
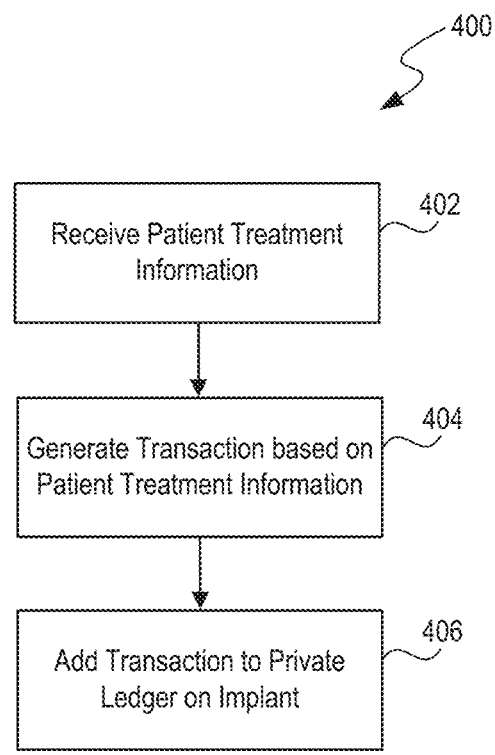
FIG. 4 is a flow chart illustrating an example process for creating patient data in a ledger stored on a medical implant.

FIG. 4 is a flow chart illustrating an example process 400 for creating patient data in a ledger stored on a medical implant.

At block 402, process 400 receives patient treatment information. Patient information can include patient identification information, a patient diagnosis, data associated with a diagnosis, a patient treatment plan, data associated with a patient treatment plan, medical images associated with the diagnosis or treatment plan, EMRs, and/or other patient information associated with patient diagnosis and treatment. The patient treatment information can be received from a patient diagnosis software system, a patient treatment software system, a patient testing software system, and/or other software systems associated with patient diagnosis and treatment.

At block 404, process 400 generates a new transaction based on the received patient treatment information. The transaction includes details of the received patient treatment information and can also include additional information, such as a unique patient identifier, information associated with the physician delivering the treatment, the facility delivering the treatment, and/or other information associated with the treatment. The transaction also includes a public key that allows those with a matching private key to access details of the transaction. The patient has ownership of the private key and can, in the future, share the private key with health care providers to access previous transactions in the ledger.

At block 406, process 400 adds the generated transaction to the blockchain ledger. In some implementations, the transaction is generated at a patient treatment computing system and then transmitted to a blockchain ledger stored on the medical implant via one or more wireless data communication means. The transaction is added to the ledger stored on the medical implant as the most recent transaction and can include all of the details of the transaction. In other implementations, the generated transaction is added to a private distributed ledger in a medical records software system and can only be accessed using the private key stored on the medical implant of the patient. In this implementation, the private key is implanted within the patient. The implanted private key can be configured to reside on an orthopedic, spine, subcutaneous, or another implant. In further implementations, the generated transaction can be added to a public ledger as a private transaction. To access the private transaction from the public ledger, the private key associated with the patient (e.g., the implanted key) must be used. Any user attempting to access the transaction without the key will not be able to see any details associated with the transaction. In this implementation, various patients can have medical records tracked on a public ledger while maintaining health data privacy for each patient.

Figure 5:
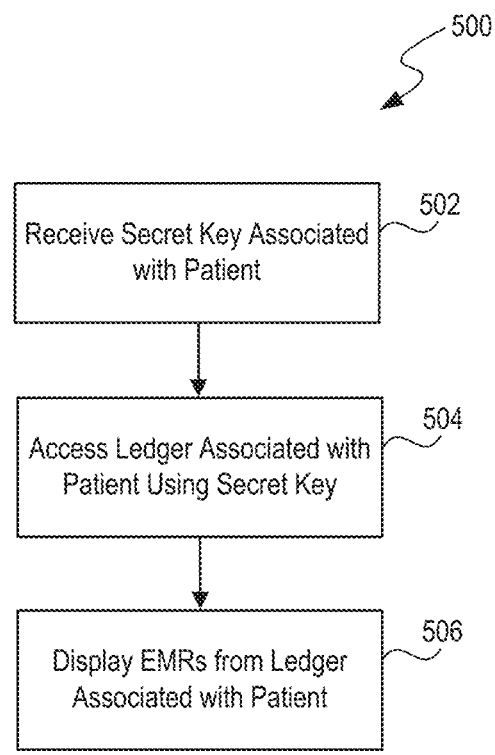
FIG. 5 is a flow chart illustrating an example process for accessing a patient's medical records.

FIG. 5 is a flow chart illustrating an example process 500 for accessing a patient's medical records.

At block 502, process 500 receives a private key associated with a patient. In some implementations, the private key is received by establishing wireless communicative contact with an implant in the patient. The implant includes a persistent memory containing the private key, which can only be accessed when wireless communicative contact is established between the implant and a computing system executing process 500, such as a patient treatment software system. The private key is unique to the patient and is the only way to access records associated with the patient. In some implementations, a request for the private key can be generated by the computing system executing process 500. The request can include a request for patient authorization to access the private key.

In some implementations, the patient may be required to agree to share the private key from the implant with process 500. For example, a confirmation mechanism, such as voice confirmation, entering a password into a software application, web application, mobile application, or the like, providing an e-signature to a physician, or another appropriate confirmation mechanism can be used. The private key from the implant can be shared using telecommunication methods such as radio frequency and other modes of proximity telecommunication technology. Until the patient successfully confirms that the private key can be shared, the private key will not be provided to the physician or medical treatment provider.

As an illustrative example, the patient authorization may include a user password, an access code/phrase, or the like that may be used to decrypt the data read from the medical implant. One or more of the components 300 (e.g., the blockchain module 344) can use the user password, etc. to decrypt the data provided by the medical implant using one or more predetermined decryption mechanisms, thereby accessing the private key. Alternatively or additionally, the patient authorization may be specifically tied to one or more user accounts. For example, the patient may provide or preset authorizations, different access levels, and/or access conditions for accounts belonging to one or more specific healthcare provider personnel (e.g., a primary care provider or a designated specialist), a generic category of healthcare providers, a family member, an authorized/selected advocate, or the like. The person/entity attempting to access the private key may be required to use a corresponding account, and the account information may be used to grant access to the private key.

The medical implant and the corresponding system can vary the access levels according to conditions, such as for certain medical emergencies. For example, an emergency care provider or a family member may be granted access to the private key (by, e.g., one or more methods/mechanisms described above) when the patient conditions (e.g., physiological markers and/or conditions reported by patient devices) match one or more predetermined patterns. The patient condition may be determined through the interfacing medical implant, which may be coupled to one or more other devices (e.g., wearable health monitors) or implants associated with the user. The attempt to access the private keys can initiate or power (such as for RFID or NFC communication protocols) the interfacing medical implant and/or other devices to conduct a status check. When the status check matches an emergency condition (e.g., one of predetermined template scenarios and/or thresholds), the interfacing medical implant can provide an indication for the receiving system. Based on the received indication, the system can allow a predetermined set of account holders to access the private key and/or authorized portions of the EMR.

At block 504, process 500 uses the received private key to access a blockchain ledger containing EMRs of the patient. In some implementations, the blockchain ledger is a private blockchain ledger stored in persistent memory on the implant of the patient. In these implementations, process 500 establishes or maintains wireless communicative contact with the implant, uses the private key to "unlock" the blockchain ledger, and then receives the blockchain ledger from the implant for viewing by the physician. In some embodiments, the physician can modify the unlocked blockchain ledger to include additional patient data, such as new scans, diagnosis, test results, or the like. In other implementations, process 500 uses the received private key to "unlock" a private blockchain ledger or access one or more blocks associated with the patient in a public blockchain ledger.

At block 506, process 500 displays the accessed EMRs of the patient to the health care provider in possession of the private key. EMRs can be presented in familiar formats including tables, databases, charts, graphics, or text. The applications and patents incorporated by reference also disclose example EMRs.

Figure 6:
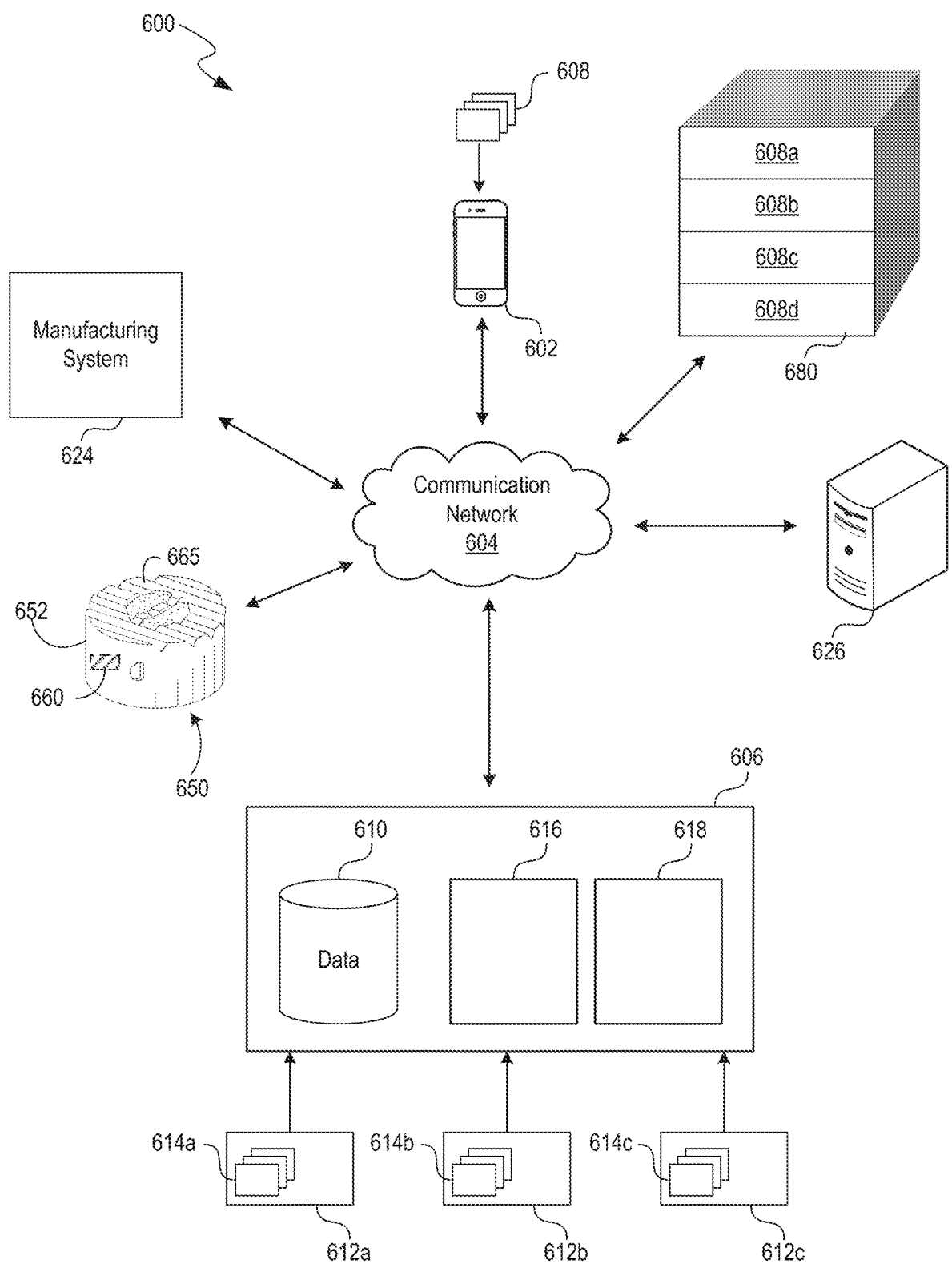
FIG. 6 is a network connection diagram illustrating a system for providing patient-specific medical care, according to an embodiment.

FIG. 6 is a network connection diagram illustrating a computing system 600 for managing, storing, and accessing healthcare data, according to an embodiment. As described in further detail herein, the system 600 can include components from or be incorporated into the systems of FIGS. 1-5. The system 600 can be configured to, for example, collect, store, monitor, and/or update healthcare data. System 600 can include one or more digital filing cabinets 680 that can contain, without limitation, one or more electronic health records (EHRs), EMRs, patient information, digital wallets (e.g., signed messages, keys, cryptocurrency, tokens, credit cards, payment information, etc.), and healthcare data. The digital filing cabinet 680 can receive and convert the healthcare data into a digital format to increase the efficiency of locating and retrieving healthcare data.

The computing system 600 can function as a cryptographic platform. The digital filing cabinet 680 can use blockchain technology to convert the healthcare data to cryptographic tokens. In some embodiments, the computing system 600 is configured to operate as a token platform based on blockchain technology. Using blockchain technology can increase the security of the healthcare data based on the authentication requirements of users to access the data. Tokens can provide verification of digital healthcare data by authenticating access credentials (e.g., public and private keys), eliminating tampering of data (data integrity), and providing a source of truth for a patient's health record. Tokens can provide ownership of data, accessibility to data, portability of data, patient-specific solutions based on the verifiable patient data, patient-specific algorithms for treatment(s), patient-selectable sharing of data, trackable usages of patient data, and generate economic value for use of data. Using blockchain technology and Tokens can provide system 600 with a method to securely track, identify ownership, link to, and/or transfer the healthcare data (e.g., transfer to intended recipients). In some embodiments, the Tokens can have an expiration date to access the data, confirmation of intended recipient, instructions for implantation (e.g., surgical robot), traceable chain of custody (e.g., supply chain), ensure authenticity (elimination of counterfeit products) of the data, and payment (reimbursement) for product (verified, traceable) in cryptocurrency.

The digital filing cabinet 680 can receive the healthcare data from a patient, healthcare provider(s), medical insurance entities, banking entities, and/or storage devices with healthcare data. Based on the type of healthcare data, the digital filing cabinet 680 can organize the healthcare data by authentication levels. For example, the patient can access all the healthcare data, but the healthcare provider is limited to medical records and cannot access the patient's medical insurance or payment information. The digital filing cabinet 680 contains the patient healthcare data 608 and organizes the patient healthcare data by different authentication levels, such as data 608a, 608b, 608c, and 608d. Each group or set of healthcare data 608a, 608b, 608c, and 608d requires a different level of authentication for a user to access. Example healthcare datasets and healthcare data are discussed in connection with FIGS. 7-8. Once the authentication level of a user is identified, the system 600 can send the healthcare data associated with the identified authentication level to the user. In some implementations, the system 600 sends the healthcare data to the patient's implant 650 for the user to retrieve or to a user device.

The number of groups of healthcare data, permission settings, stored data, organizational schemes, and/or other configurations can be set by the user, healthcare provider, or the like. Data can be automatically collected and incorporated into the appropriate group of data. In cloud-based implementations, the digital filing cabinet 680 can be stored on a cloud server to provide remote access. In some implementations, the digital filing cabinet 680 can be stored locally to provide access to records at any time. Additionally, local storage of the digital filing cabinets 680 with digital wallets containing blockchain information can be stored locally. Each group of healthcare data 608a, 608b, 608c, and 608d can be associated by the user (or data management system) with, for example, a procedure, a physician, a healthcare provider, and/or medical manufacture. The user can add information, including annotation, personal notes, and other information that may or may not be viewable by other users, to the healthcare data 608a, 608b, 608c and 608d and can select the type, amount, and/or level of authorization/access. In some implementations, the healthcare data 608a, 608b, 608c and 608d can include blockchain data, wallets, tokens, token-linked data, containerized data, keys, unique IDs, encryption programs, etc.

In some embodiments, a group of healthcare data 608a can be associated with an implant 650 in the patient (not shown) and can include a surgical plan for the implant 650, manufacturing data for the implant 650, notifications (e.g., recall notifications), predicted post-treatment analytics, physician information, and other information (e.g., pre-operative, intra-operative, and/or post-operative information) associated with the implant 650 or procedure. The user can set one or more rules for allowing authorized user(s) to access (e.g., all or a portion of) the healthcare data 608a or healthcare data 608. For example, the user can authorize viewing of post-operative data 608a by a physical therapist who can access post-operative collected data to modify therapy plans for the user. The user can authorize a primary care physician access to the healthcare data 608 to provide general healthcare treatment and can authorize a surgeon access to the healthcare data 608a to evaluate surgical outcomes and recommend additional treatments, such as future surgical interventions.

The healthcare data 608b can include, for example, general electronic medical records (EMRs) of the patient, including health records not associated with the implant. The user can authorize a primary care physician access to the healthcare data 608b to provide general healthcare treatment. The user can authorize family members and third parties access to the healthcare data 608b. Accordingly, the access settings for the healthcare data 608a and 608b can be the same or different.

The healthcare data 608c can include, for example, data from a user device input. The data can be from, for example, wearables (e.g., smartwatches, pedometers, etc.), smartphones, biometric sensors (e.g., analyte sensors, glucose sensors, etc.), heart monitors, exercise monitoring equipment, or the like. The user can authorize family members to access the data 608c to help with compliance with, for example, dietary goals, exercise goals, or other user goals.

Data can be automatically provided to the digital filing cabinet 680. In some embodiments, for example, an implant retrieval feature 660 can provide instructions for accessing the digital filing cabinet 680. An imaging apparatus (e.g., an MRI machine, x-ray machine, scanner, etc.) can read information from the retrieval feature 660. The information included can be transmitted, via communication network 604, to the digital filing cabinet 680. The transmitted information can include, without limitation, authorization information (e.g., digital filing cabinet login information), patient identification, implant identifier, and/or other information to use to authorize, locate, and/or categorize data.

The digital filing cabinet 680 can store data transmitted, via the communication network 604, from manufacturing system 624 and can analyze received data and correlate the data, such as manufacturing data, with the received implant data. Correlation settings can be modified or set by the user. Additionally, surgical plans can be transmitted, via the communication network 604, from the system 606 to the digital filing cabinet 680. The surgical plan can be associated with the manufacturing data, implant data, and other information associated with the implant 650. The digital filing cabinet 680 can send, via the communication network 604, patient healthcare data to the system 606. This allows newly available data to be automatically or periodically transmitted to the analysis system 606. The analysis system 606 can analyze the newly received data using, for example, one or more models to provide analytics to the client computing device 602, digital filing cabinet 680, manufacturing system 624, physician, etc. The client computing device 602 can receive analytics and notifications from, for example, the digital filing cabinet 680, analysis system 606, and/or other data sources.

In some embodiments, the system 600 is configured to manage patient healthcare data on user devices, cloud-based devices, and/or healthcare provider devices. The healthcare data can include patient medical records, medical insurance information, health metrics from wearable devices, surgical information, surgical plans, technology recommendations (e.g., device and/or instrument recommendations), and/or medical device information (e.g., an implanted medical device (also referred to herein as an "implant" or "implanted device") or implant delivery instrument). The digital wallet can be used to manage blockchain healthcare data (e.g., blockchain EHRs, EMRs, etc.), insurance actions (e.g., payments, claim submissions, etc.), or the like.

In some embodiments, the system 600 manages the authentication required to access the medical records. The authentication can include blockchain, tokens, keys, biometrics, geolocation, passwords, or any authentication credentials. Healthcare data that is particular to a patient, is referred to herein as a "patient-specific" or "personalized" healthcare data. The digital filing cabinet 680 can store one or more keys (e.g., private keys, public keys, etc.), authentication information, and/or other information for accessing data, including electronic medical records associated with a patient from a distributed blockchain ledger of electronic medical records. U.S. application Ser. No. 17/463,054 discloses systems and methods for tracking patient medical records using, for example, keys and is incorporated by reference in its entirety. The system 600 can include systems and features for linking medical devices with patient data as disclosed in U.S. patent Ser. No. 16/990,810, which is incorporated by reference in its entirety. Digital filing cabinets can be used to receive user feedback as described in U.S. application Ser. No. 16/699,447, which is incorporated by reference in its entirety. The system disclosed herein can include digital filing cabinets for designing medical devices using the methods disclosed in U.S. application Ser. No. 16/699,447. For example, the computing system 600 can be used to access healthcare data from a distributed ledger of electronic medical records using tokens, keys. etc. The distributed ledger can represent a private blockchain ledger or a public blockchain ledger storing the one or more electronic medical records as private transactions. Each electronic medical record can be stored as a hashed transaction in the distributed ledger of electronic medical records. The private key associated with the patient or implant 650 can be used to access details of hashed transactions associated with the patient. The electronic medical records associated with the patient retrieved from the digital filing cabinet 680 can be displayed for viewing.

The system 600 includes a client computing device 602, which can be a user device, such as a smartphone, mobile device, laptop, desktop, personal computer, tablet, phablet, wearable device (e.g., smartwatch), or other such devices known in the art. As discussed further herein, the client computing device 602 can include one or more processors, and memory storing instructions executable by the one or more processors to perform the methods described herein. The client computing device 602 can be associated with a healthcare provider or a patient. Although FIG. 6 illustrates a single client computing device 602, in alternative embodiments, the client computing device 602 can instead be implemented as a client computing system encompassing a plurality of computing devices, such that the operations described herein with respect to the client computing device 602 can instead be performed by the computing system and/or the plurality of computing devices.

The client computing device 602 is configured to receive patient healthcare data 608 associated with a patient. The patient healthcare data 608 can include data representative of the patient's condition, anatomy, pathology, medical history, preferences, and/or any other information or parameters relevant to the patient. For example, the patient healthcare data 608 can include medical history, surgical intervention data, treatment outcome data, progress data (e.g., physician notes), patient feedback (e.g., feedback acquired using quality of life questionnaires, surveys), clinical data, provider information (e.g., physician, hospital, surgical team), patient information (e.g., demographics, sex, age, height, weight, type of pathology, occupation, activity level, tissue information, health rating, comorbidities, health related quality of life (HRQL)), vital signs, diagnostic results, medication information, allergies, image data (e.g., camera images, Magnetic Resonance Imaging (MRI) images, ultrasound images, Computerized Aided Tomography (CAT) scan images, Positron Emission Tomography (PET) images, X-Ray images), diagnostic equipment information (e.g., manufacturer, model number, specifications, user-selected settings/configurations, etc.), or the like. In some embodiments, the patient healthcare data 608 includes data representing one or more of patient identification number (ID), age, gender, body mass index (BMI), lumbar lordosis, Cobb angle(s), pelvic incidence, disc height, segment flexibility, bone quality, rotational displacement, range of motion, disability score, and/or treatment level of the spine. In some embodiments, the client computing device 602 can locally store the digital filing cabinet 680, healthcare data 608, and/or other information. The client computing device 602 can store account information for allowing the user to automatically access remote digital filing cabinets or accounts with or without login credentials. In some embodiments, the client computing device 602 can periodically or continuously receive newly available data (e.g., biometrics from wearables, user input, etc.) and can transmit all of or a portion of the newly available data to, for example, remote storage systems, such as the digital filing cabinet 680, server 606, or the like.

The client computing device 602 is operably connected via a communication network 604 to a server 606, thus allowing for data transfer between the client computing device 602 and the server 606. The communication network 604 may be a wired and/or a wireless network. The communication network 604, if wireless, may be implemented using communication techniques such as Visible Light Communication (VLC), Worldwide Interoperability for Microwave Access (WiMAX), Long term evolution (LTE), Wireless local area network (WLAN), Infrared (IR) communication, Public Switched Telephone Network (PSTN), Radio waves, and/or other communication techniques known in the art.

The server 606, which may also be referred to as a "healthcare data network" or "healthcare data analytics network," can include one or more computing devices and/or systems. As discussed further herein, the server 606 can include one or more processors, and memory storing instructions executable by the one or more processors to perform the methods described herein. In some embodiments, the server 606 is implemented as a distributed "cloud" computing system or facility across any suitable combination of hardware and/or virtual computing resources.

The cloud analytics integration platform 626 is connected to the communication network 604. The analytics integration platform 626 can analyze the healthcare data and integrate data collected from the patient and healthcare providers into the digital filing cabinet. The analytics integration platform 626 can integrate surgical plans and patient plan, identify health metrics of concern for the patient, display patient information and goals, perform post-operative analytics, and generate healthcare provider or patient notifications (e.g., monitoring based on data from wearables, requesting updated information, scheduling appointments, or notifying of emergencies).

The medical implant 650 can be an intervertebral device that includes a body 652 configured to interface with one or more identified anatomical structures (e.g., one or more vertebral bodies or endplates) at and/or proximate the target implantation site (e.g., between one or more vertebral bodies or endplates). The implant body 652 can include one or more structural features designed to engage one or more identified anatomical structures. For example, in the illustrated embodiment, the implant 650 can include an upper surface 665 and a lower surface (not shown) configured to seat against vertebral bodies of the spine. In some embodiments, the upper surface 665 and the lower surface can have contours that match contours of the vertebral endplates, such that the upper surface 665 and lower surface "mate" with the corresponding vertebral endplates they engage with. The dimensions, contours, topology, composition, and/or other implant data can be part of the EMR. In some embodiments, such as the illustrated embodiment, the upper surface 665 and/or the lower surface can be textured (e.g., via roughenings, knurlings, ridges, and the like). Texturing data can be part of the manufacturing data stored in the EMRs. For lordotic correction, the upper surface 665 and the lower surface may be angled with respect to one another, and the EMR can include the angle and sizes of these surfaces.

A user (e.g., a physician, healthcare provider, patient, etc.) can access EMRs using a retrieval feature 660. For example, in embodiments in which the retrieval feature 660 is a barcode corresponding to the unique identifier, the user can scan the retrieval feature 660 using, for example, one or more cameras on the computing device and/or otherwise input the unique identifier into the computing device. Once the unique identifier is inputted into the computing system, the computing system can send the unique identifier to a remote server (e.g., via a communication network) with a request to provide the corresponding patient-specific healthcare data set. In response to the request, and as described above, the server can locate the specific data set associated with the unique identifier and transmit the data set to the computing device for display to the user. The implant 650 can include other features assisting with accessing the ledger and viewing the EMRs.

The retrieval feature 660 can be used to carry patient data, such as one or more tokens (e.g., NFTs), keys (e.g., private keys for unlocking patient medical records stored on a blockchain ledger), or blockchain data. The medical implant 650 can be blockchain-enabled to establish communicative contact using a proximity communication mode. A private key stored on the retrieval feature 660 can be used to access the patient-specific healthcare data. In some implementations, the medical implant 650 also contains a private blockchain ledger for tracking EMRs associated with the patient. As the patient undergoes various treatments, new EMRs and updates to existing EMRs for the patient are generated and stored as "transactions" in a blockchain ledger. To access the EMRs associated with the patient, the private key from the medical implant 650 must be used to "unlock" the EMRs stored in the blockchain ledger. The patient can provide this private key to healthcare providers and other interested parties by a secure platform, mobile application, digital key, or the like. In some embodiments, the EMRs are encrypted using an encryption key that the healthcare provider decrypts. Additionally or alternatively, re-keying protocols, certification management protocols (e.g., enrollment certification protocol, transaction certification protocol, etc.), and other protocols can be utilized for variable access and permissions. The patient can manage the data of the EMR to share selected data only. For example, the patient can keep a section of the EMR private while sharing another section of the EMR. The system also allows for user-controlled settings, such as settings for minors, family members, relatives, and/or other user-controlled settings.

An EMR can include patient data associated with the implant design and design process. If the implant is an artificial disc, for example, the stored data can include kinematic data (e.g., pre-operative patient data, target kinematic data, etc.), manufacturing data, design parameters, target service life data, physician recommendations/notes, etc. The disc can include an articulating implant body with plates contoured to match vertebral endplates, custom articulating members between the plates for providing patient-specific motion, etc. If the implant is an intervertebral cage, the stored data can include materials specifications of the implant body, dimensions of the implant body, manufacturing data, design parameters, target service life data, physician recommendations/notes, etc. The applications and patents incorporated by reference disclose data (e.g., surgical plans, implant specifications, data sets, etc.) that can be associated with the retrieval feature 660.

In some implementations, the patient can set variable permissions for access to transactions and details stored in the blockchain ledger. For example, particular medical providers may only be given access to certain transactions related to particular kinds of medical procedures. In other implementations, permissions can be set based on the patient, such as having child settings for children with an implant.

The medical implant 650 can also track and monitor various health related data for the patient. For example, the medical implant 650 can include one or more sensors configured to measure pressures, loads, or forces applied by anatomical elements to monitor, for example, activity, loading, etc. The medical implant 650 can continuously or periodically collect data indicating activity level, activities performed, disease progression, or the like. For example, loading across the implant 650 can be tracked over a period of time. The applications and patents incorporated by reference disclose techniques for monitoring, collecting data, and transmitting data. In some embodiments, the medical implant 650 can identify events, such as excess loading, imbalance of the spine, or the like. In some embodiments, the patient is monitored with automatic blockchain updating based on activity (e.g., surgical procedure, change in status, etc.), disability (e.g., new disability, progression of disability, etc.), and/or healthcare events. The healthcare events can include imaging, diagnosis, treatment, and/or outcomes and event data that can be encoded in the blockchain. Collected data can be used as historical patient data used to treat another patient. The applications and patents incorporated by reference also disclose usage of historical data, imaging data, surgical plans, simulations, modeled outcomes, treatment protocols, and outcome values that can be encoded in the blockchain. The digital filing cabinets can also track and monitor various health related data for the patient and can include one or more digital wallets, such as blockchain digital wallets for managing blockchain data, ledger wallets, etc. The number, configuration, and/or contents of digital wallets can be selected by the user, physician, etc. The digital wallets can be used to access blockchains to automatically update blockchains for any number of implants.

In some implementations, two or more implants can be used. For example, a patient can have both a spinal implant with an encoded chip containing the private key and/or the private blockchain ledger containing the EMRs of the patient and a subcutaneous digital implant. The subcutaneous digital implant acts as an intermediary device, communicating with both the spinal implant containing the private key and/or the private blockchain ledger and an external computing device, such as a patient treatment computing system. The subcutaneous digital implant may also include data of its own, such as patient identifying information, biometric data, and the like. In some embodiments, the subcutaneous digital implant may include the private key and/or the private blockchain ledger containing the EMRs of the patient. The patient-specific implant can be any of the implants described herein or in any patent references incorporated by reference herein. For example, the patient-specific implant can include one or more of screws (e.g., bone screws, spinal screws, pedicle screws, facet screws), interbody implant devices (e.g., intervertebral implants), cages, plates, rods, discs, fusion devices, spacers, rods, expandable devices, stents, brackets, ties, scaffolds, fixation devices, anchors, nuts, bolts, rivets, connectors, tethers, fasteners, joint replacements (e.g., artificial discs), hip implants, or the like. A patient-specific implant design can include data representing one or more of physical properties (e.g., size, shape, volume, material, mass, weight), mechanical properties (e.g., stiffness, strength, modulus, hardness), and/or biological properties (e.g., osteointegration, cellular adhesion, anti-bacterial properties, anti-viral properties) of the implant. For example, a design for an orthopedic implant can include implant shape, size, material, and/or effective stiffness (e.g., lattice density, number of struts, location of struts, etc.).

Additional implant types, configurations, and structural features suitable for engaging identified anatomical features are described, for example, in U.S. application Ser. No. 16/207,116, filed Dec. 1, 2018, and U.S. application Ser. No.

16/987,113, filed Aug. 6, 2020, the disclosures of which are incorporated by reference herein in their entireties. For example, the medical implants can be pedicle screws, patient-specific implants, interbody implant systems, artificial discs, expandable intervertebral implants, sacroiliac implants, plates, arthroplasty devices for orthopedic joints, non-structural implants, or other devices disclosed in the patents and applications incorporated herein by reference.

The medical implant 650 can be used to track and monitor medical data associated with the patient. U.S. Application No. 63/218,190 discloses implants capable of collecting data, assigning weighting/values, and communicating with other devices. The monitoring can be used with prescriptive systems, such as the systems disclosed in U.S. Pat. No. 10,902,944 and U.S. application Ser. No. 17/342,439, which are incorporated by reference in their entireties. For example, the patient's data can be incorporated into one or more training sets for a machine learning system or other systems disclosed in the incorporated by reference patents and applications. The medical implant 650 can also be a multipurpose implant, providing structure to address a medical issue in the body of the patient while also carrying information regarding the patient. For example, the medical implant 650 can be a pacemaker, a plate or pin to correctly position a previously broken bone or set of bones, and the like. Tokens can be used to store, track, authenticate, transmit, and/or handle data disclosed in U.S. Pat. No. 10,902,944 and U.S. application Ser. No. 17/342,439. For example, surgical plans, pre-operative data, post-operative data, outcome analysis, implant designs, transactions, healthcare data, etc. can be managed using tokens. The digital filing cabinet 680 can also be incorporated into the systems disclosed in U.S. Pat. No. 10,902,944 and U.S. application Ser. No. 17/342,439 to track and monitor patient-managed medical data.

The client computing device 602 and server 606 can individually or collectively perform the various methods described herein for storing and retrieving healthcare data. For example, some or all of the steps of the methods described herein can be performed by the client computing device 602 alone, the server 606 alone, or a combination of the client computing device 602 and the server 606. In some embodiments, the client computing device 602 includes one or more digital filing cabinets 680. Thus, although certain operations are described herein with respect to the server 606, it shall be appreciated that these operations can also be performed by the client computing device 602, and vice-versa.

The server 606 includes at least one database 610 configured to store reference data useful for the providing, managing, or analyzing patient-specific healthcare data from implant methods described herein. The reference data can include historical and/or clinical data from the same or other patients, data collected from prior surgeries and/or other treatments of patients by the same or other healthcare providers, data relating to medical device designs, data collected from study groups or research groups, data from practice databases, data from academic institutions, data from implant manufacturers or other medical device manufacturers, data from imaging studies, data from simulations, clinical trials, demographic data, treatment data, outcome data, mortality rates, or the like.

In some embodiments, the database 610 includes a plurality of reference patient data sets, each patient reference data set associated with a corresponding reference patient. For example, the reference patient can be a patient that previously received treatment or is currently receiving treatment. Each reference patient data set can include data representative of the corresponding reference patient's condition, anatomy, pathology, medical history, disease progression, preferences, and/or any other information or parameters relevant to the reference patient, such as any of the data described herein with respect to the healthcare data 608. In some embodiments, the reference patient data set includes pre-operative data, intra-operative data, and/or post-operative data. For example, a reference patient data set can include data representing one or more of patient ID, age, gender, BMI, lumbar lordosis, Cobb angle(s), pelvic incidence, disc height, segment flexibility, bone quality, rotational displacement, and/or treatment level of the spine. As another example, a reference patient data set can include treatment data regarding at least one treatment procedure performed on the reference patient, such as descriptions of surgical procedures or interventions (e.g., surgical approaches, bony resections, surgical maneuvers, corrective maneuvers, placement of implants or other devices). In some embodiments, the treatment data includes medical device design data for at least one medical device used to treat the reference patient, such as physical properties (e.g., size, shape, volume, material, mass, weight), mechanical properties (e.g., stiffness, strength, modulus, hardness), and/or biological properties (e.g., osteo-integration, cellular adhesion, anti-bacterial properties, anti-viral properties). In yet another example, a reference patient data set can include outcome data representing an outcome of the treatment of the reference patient, such as corrected anatomical metrics, presence of fusion, HRQL, activity level, return to work, complications, recovery times, efficacy, mortality, and/or follow-up surgeries.

In some embodiments, the server 606 receives at least some of the reference patient data sets from a plurality of healthcare provider computing systems (e.g., systems 612a-612c, collectively 612), digital filing cabinets, or combinations thereof. The server 606 can be connected to the healthcare provider computing systems 612 via one or more communication networks (not shown). Each healthcare provider computing system 612 can be associated with a corresponding healthcare provider (e.g., physician, surgeon, medical clinic, hospital, healthcare network, etc.). Each healthcare provider computing system 612 can include at least one reference patient data set (e.g., reference patient data sets 614a-614c, collectively 614) associated with reference patients treated by the corresponding healthcare provider. The reference patient data sets 614 can include, for example, electronic medical records, electronic health records, biomedical data sets, etc. The reference patient data sets 614 can be received by the server 606 from the healthcare provider computing systems 612 and can be reformatted into different formats for storage in the database 610. Optionally, the reference patient data sets 614 can be processed (e.g., cleaned) to ensure that the represented patient parameters are likely to be useful in the treatment planning methods described herein.

As described in further detail herein, the server 606 can be configured with one or more algorithms that generate patient-specific treatment plan data (e.g., treatment procedures, medical devices) based on the reference data. In some embodiments, the patient-specific data is generated based on correlations between the patient data set 608 and the reference data. Optionally, the server 606 can predict outcomes, including recovery times, efficacy based on clinical end points, likelihood of success, predicted mortality, predicted related follow-up surgeries, or the like. In some embodiments, the server 606 can continuously or periodically analyze patient data (including patient data obtained during the patient stay) to determine near real-time or real-time risk scores, mortality prediction, etc.

In some embodiments, the server 606 includes one or more modules for performing one or more steps of the patient-specific treatment planning methods described herein. For example, in the depicted embodiment, the server 606 includes a data analysis module 616 and a treatment planning module 618. In alternative embodiments, one or more of these modules may be combined with each other, or may be omitted. Thus, although certain operations are described herein with respect to a particular module or modules, this is not intended to be limiting, and such operations can be performed by a different module or modules in alternative embodiments.

The data analysis module 616 is configured with one or more algorithms for identifying a subset of reference data from the database 610 that is likely to be useful in developing a patient-specific treatment plan. The database 610 can retrieve or receive data from the client computing device 602, digital filing cabinet 680, or other data source. For example, the data analysis module 616 can compare patient-specific data (e.g., the patient data set 608 received from the client computing device 602) to the reference data from the database 610 (e.g., the reference patient data sets) to identify similar data (e.g., one or more similar patient data sets in the reference patient data sets). The reference data can be updated in real-time or almost real-time using other patient data accessible via the network 604. The comparison can be based on one or more parameters, such as age, gender, BMI, lumbar lordosis, pelvic incidence, and/or treatment levels. The parameter(s) can be used to calculate a similarity score for each reference patient. The similarity score can represent a statistical correlation between the patient data set 608 and the reference patient data set. Accordingly, similar patients can be identified based on whether the similarity score is above, below, or at a specified threshold value. For example, as described in greater detail below, the comparison can be performed by assigning values to each parameter and determining the aggregate difference between the subject patient and each reference patient. Reference patients whose aggregate difference is below a threshold can be considered to be similar patients.

The data analysis module 616 can further be configured with one or more algorithms to select a subset of the reference patient data sets, e.g., based on similarity to the patient data set 608 and/or treatment outcome of the corresponding reference patient. For example, the data analysis module 616 can identify one or more similar patient data sets in the reference patient data sets, and then select a subset of the similar patient data sets based on whether the similar patient data set includes data indicative of a favorable or desired treatment outcome. The outcome data can include data representing one or more outcome parameters, such as corrected anatomical metrics, presence of fusion, HRQL, activity level, complications, recovery times, efficacy, mortality, or follow-up surgeries. As described in further detail below, in some embodiments, the data analysis module 616 calculates an outcome score by assigning values to each outcome parameter. A patient can be considered to have a favorable outcome if the outcome score is above, below, or at a specified threshold value.

In some embodiments, the data analysis module 616 selects a subset of the reference patient data sets based at least in part on user input (e.g., from a clinician, surgeon, physician, or healthcare provider). For example, the user input can be used in identifying similar patient data sets. In some embodiments, weighting of similarity and/or outcome parameters can be selected by a healthcare provider or physician to adjust the similarity and/or outcome score based on clinician input. In further embodiments, the healthcare provider or physician can select the set of similarity and/or outcome parameters (or define new similarity and/or outcome parameters) used to generate the similarity and/or outcome score, respectively.

In some embodiments, the data analysis module 616 includes one or more algorithms used to select a set or subset of the reference patient data sets based on criteria other than patient parameters. For example, one or more algorithms can be used to select the subset based on healthcare provider parameters (e.g., based on healthcare provider ranking/scores such as hospital/physician expertise, number of procedures performed, hospital ranking, etc.) and/or healthcare resource parameters (e.g., diagnostic equipment, facilities, surgical equipment such as surgical robots), or other non-patient related information that can be used to predict outcomes and risk profiles for procedures for the present healthcare provider. For example, reference patient data sets with images captured from similar diagnostic equipment can be aggregated to reduce or limit irregularities due to variation between diagnostic equipment. Additionally, patient-specific treatment plans can be developed for a particular healthcare provider using data from similar healthcare providers (e.g., healthcare providers with traditionally similar outcomes, physician expertise, surgical teams, etc.). In some embodiments, reference healthcare provider data sets, hospital data sets, physician data sets, surgical team data sets, post-treatment data set, and other data sets can be utilized. By way of example, a patient-specific treatment plan to perform a battlefield surgery can be based on reference patient data from similar battlefield surgeries and/or datasets associated with battlefield surgeries. In another example, the patient-specific treatment plan can be generated based on available robotic surgical systems. The reference patient data sets can be selected based on patients that have been operated on using comparable robotic surgical systems under similar conditions (e.g., size and capabilities of surgical teams, hospital resources, etc.).

The treatment planning module 618 is configured with one or more algorithms to generate at least one treatment plan (e.g., pre-operative plans, surgical plans, post-operative plans etc.) based on the output from the data analysis module 616. In some embodiments, the treatment planning module 618 is configured to develop and/or implement at least one predictive model for generating the patient-specific treatment plan, also known as a "prescriptive model." The predictive model(s) can be developed using clinical knowledge, statistics, machine learning, AI, neural networks, or the like. In some embodiments, the output from the data analysis module 616 is analyzed (e.g., using statistics, machine learning, neural networks, AI) to identify correlations between data sets, patient parameters, healthcare provider parameters, healthcare resource parameters, treatment procedures, medical device designs, and/or treatment outcomes. These correlations can be used to develop at least one predictive model that predicts the likelihood that a treatment plan will produce a favorable outcome for the particular patient. The predictive model(s) can be validated, e.g., by inputting data into the model(s) and comparing the output of the model to the expected output.

In some embodiments, the treatment planning module 618 is configured to generate the treatment plan based on previous treatment data from reference patients. For example, the treatment planning module 618 can receive a selected subset of reference patient data sets and/or similar patient data sets from the data analysis module 616, and determine or identify treatment data from the selected subset. The treatment data can include, for example, treatment procedure data (e.g., surgical procedure or intervention data) and/or medical device design data (e.g., implant design data) that are associated with favorable or desired treatment outcomes for the corresponding patient. The treatment planning module 618 can analyze the treatment procedure data and/or medical device design data to determine an optimal treatment protocol for the patient to be treated. For example, the treatment procedures and/or medical device designs can be assigned values and aggregated to produce a treatment score. The patient-specific treatment plan can be determined by selecting treatment plan(s) based on the score (e.g., higher or highest score; lower or lowest score; score that is above, below, or at a specified threshold value). The personalized patient-specific treatment plan can be based on, at least in part, the patient-specific technologies or patient-specific selected technology.

Alternatively or in combination, the treatment planning module 618 can generate the treatment plan based on correlations between data sets. For example, the treatment planning module 618 can correlate treatment procedure data and/or medical device design data from similar patients with favorable outcomes (e.g., as identified by the data analysis module 616). Correlation analysis can include transforming correlation coefficient values to values or scores. The values/scores can be aggregated, filtered, or otherwise analyzed to determine one or more statistical significances. These correlations can be used to determine treatment procedure(s) and/or medical device design(s) that are optimal or likely to produce a favorable outcome for the patient to be treated.

Alternatively or in combination, the treatment planning module 618 can generate the treatment plan using one or more AI techniques. AI techniques can be used to develop computing systems capable of simulating aspects of human intelligence, e.g., learning, reasoning, planning, problem-solving, decision making, etc. AI techniques can include, but are not limited to, case-based reasoning, rule-based systems, artificial neural networks, decision trees, support vector machines, regression analysis, Bayesian networks (e.g., naïve Bayes classifiers), genetic algorithms, cellular automata, fuzzy logic systems, multi-agent systems, swarm intelligence, data mining, machine learning (e.g., supervised learning, unsupervised learning, reinforcement learning), and hybrid systems.

In some embodiments, the treatment planning module 618 generates the treatment plan using one or more trained machine learning models. Various types of machine learning models, algorithms, and techniques are suitable for use with the present technology. In some embodiments, the machine learning model is initially trained on a training data set, which is a set of examples used to fit the parameters (e.g., weights of connections between "neurons" in artificial neural networks) of the model. For example, the training data set can include any of the reference data stored in database 610, such as a plurality of reference patient data sets or a selected subset thereof (e.g., a plurality of similar patient data sets).

In some embodiments, the machine learning model (e.g., a neural network or a naïve Bayes classifier) may be trained on the training data set using a supervised learning method (e.g., gradient descent or stochastic gradient descent). The training dataset can include pairs of generated "input vectors" with the associated corresponding "answer vector" (commonly denoted as the target). The current model is run with the training data set and produces a result, which is then compared with the target, for each input vector in the training data set. Based on the result of the comparison and the specific learning algorithm being used, the parameters of the model are adjusted. The model fitting can include both variable selection and parameter estimation. The fitted model can be used to predict the responses for the observations in a second data set called the validation data set. The validation data set can provide an unbiased evaluation of a model fit on the training data set while tuning the model parameters. Validation data sets can be used for regularization by early stopping, e.g., by stopping training when the error on the validation data set increases, as this may be a sign of overfitting to the training data set. In some embodiments, the error of the validation data set error can fluctuate during training, such that ad-hoc rules may be used to decide when overfitting has truly begun. Finally, a test data set can be used to provide an unbiased evaluation of a final model fit on the training data set.

To generate a treatment plan, the patient data set 608 can be input into the trained machine learning model(s). Additional data, such as the selected subset of reference patient data sets and/or similar patient data sets, and/or treatment data from the selected subset, can also be input into the trained machine learning model(s). The trained machine learning model(s) can then calculate whether various candidate treatment procedures and/or medical device designs are likely to produce a favorable outcome for the patient. Based on these calculations, the trained machine learning model(s) can select at least one treatment plan for the patient. In embodiments where multiple trained machine learning models are used, the models can be run sequentially or concurrently to compare outcomes and can be periodically updated using training data sets. The treatment planning module 618 can use one or more of the machine learning models based the model's predicted accuracy score.

The patient-specific treatment plan generated by the treatment planning module 618 can include at least one patient-specific treatment procedure (e.g., a surgical procedure or intervention) and/or at least one patient-specific medical device (e.g., an implant or implant delivery instrument). A patient-specific treatment plan can include an entire surgical procedure or portions thereof. Additionally, one or more patient-specific medical devices can be specifically selected or designed for the corresponding surgical procedure, thus allowing for the various components of the patient-specific technology to be used in combination to treat the patient.

In some embodiments, the patient-specific treatment procedure includes an orthopedic surgery procedure, such as spinal surgery, hip surgery, knee surgery, jaw surgery, hand surgery, shoulder surgery, elbow surgery, total joint reconstruction (arthroplasty), skull reconstruction, foot surgery, or ankle surgery. Spinal surgery can include spinal fusion surgery, such as posterior lumbar interbody fusion (PLIF), anterior lumbar interbody fusion (ALIF), transverse or transforaminal lumbar interbody fusion (TLIF), lateral lumbar interbody fusion (LLIF), direct lateral lumbar interbody fusion (DLIF), or extreme lateral lumbar interbody fusion (XLIF). In some embodiments, the patient-specific treatment procedure includes descriptions of and/or instructions for performing one or more aspects of a patient-specific surgical procedure. For example, the patient-specific surgical procedure can include one or more of a surgical approach, a corrective maneuver, a bony resection, or implant placement.

In some embodiments, the patient-specific medical device design includes a design for an orthopedic implant and/or a design for an instrument for delivering an orthopedic implant. Examples of such implants include, but are not limited to, screws (e.g., bone screws, spinal screws, pedicle screws, facet screws), interbody implant devices (e.g., intervertebral implants), cages, plates, disks, fusion devices, spacers, rods, expandable devices, stents, brackets, ties, scaffolds, fixation device, anchors, nuts, bolts, rivets, connectors, tethers, fasteners, joint replacements, hip implants, or the like. Examples of instruments include, but are not limited to, screw guides, cannulas, ports, catheters, insertion tools, or the like.

A patient-specific medical device design can include data representing one or more of physical properties (e.g., size, shape, volume, material, mass, weight), mechanical properties (e.g., stiffness, strength, modulus, hardness), and/or biological properties (e.g., osteo-integration, cellular adhesion, anti-bacterial properties, anti-viral properties) of a corresponding medical device. For example, a design for an orthopedic implant can include implant shape, size, material, and/or effective stiffness (e.g., lattice density, number of struts, location of struts, etc.). In some embodiments, the generated patient-specific medical device design is a design for an entire device. Alternatively, the generated design can be for one or more components of a device, rather than the entire device.

In some embodiments, the design is for one or more patient-specific device components that can be used with standard, off-the-shelf components. For example, in a spinal surgery, a pedicle screw kit can include both standard components and patient-specific customized components. In some embodiments, the generated design is for a patient-specific medical device that can be used with a standard, off-the-shelf delivery instrument. For example, the implants (e.g., screws, screw holders, rods) can be designed and manufactured for the patient, while the instruments for delivering the implants can be standard instruments. This approach allows the components that are implanted to be designed and manufactured based on the patient's anatomy and/or surgeon's preferences to enhance treatment. The patient-specific devices described herein are expected to improve delivery into the patient's body, placement at the treatment site, and/or interaction with the patient's anatomy.

In embodiments where the patient-specific treatment plan includes a surgical procedure to implant a medical device, the treatment planning module 618 can also store various types of implant surgery information, such as implant parameters (e.g., types, dimensions), availability of implants, aspects of a pre-operative plan (e.g., initial implant configuration, detection, and measurement of the patient's anatomy, etc.), FDA requirements for implants (e.g., specific implant parameters and/or characteristics for compliance with FDA regulations), or the like. In some embodiments, the treatment planning module 618 can convert the implant surgery information into formats usable for machine-learning based models and algorithms. For example, the implant surgery information can be tagged with particular identifiers for formulas or can be converted into numerical representations suitable for supplying to the trained machine learning model(s). The treatment planning module 618 can also store information regarding the patient's anatomy, such as two- or three-dimensional images or models of the anatomy, and/or information regarding the biology, geometry, and/or mechanical properties of the anatomy. The anatomy information can be used to inform implant design and/or placement.

The treatment plan(s) generated by the treatment planning module 618 can be transmitted via the communication network 604 to the digital filing cabinet 680 and/or client computing device 602 for output to a user (e.g., clinician, surgeon, healthcare provider, patient). In some embodiments, the client computing device 602 includes or is operably coupled to a display for outputting the treatment plan(s). The display can include a graphical user interface (GUI) for visually depicting various aspects of the treatment plan(s). For example, the display can show various aspects of a surgical procedure to be performed on the patient, such as the surgical approach, treatment levels, corrective maneuvers, tissue resection, and/or implant placement. To facilitate visualization, a virtual model of the surgical procedure can be displayed. As another example, the display can show a design for a medical device to be implanted in the patient, such as a two- or three-dimensional model of the device design. The display can also show patient information, such as two- or three-dimensional images or models of the patient's anatomy where the surgical procedure is to be performed and/or where the device is to be implanted. The client computing device 602 can further include one or more user input devices (not shown) allowing the user to modify, select, approve, and/or reject the displayed treatment plan (s).

In some embodiments, the medical device design(s) generated by the treatment planning module 618 can be transmitted from the client computing device 602 and/or server 606 to a manufacturing system 624 for manufacturing an implant or a corresponding medical device. The manufacturing system 624 can be located on-site or off-site. The implant may be manufactured by any suitable manufacturing system. The digital filing cabinet 680 can store the generated medical device design(s), manufacturing data (e.g., CAM data, print data, etc.), manufacturing information, data for generating surgical plans, surgical plans, surgical plan reports, post-operative data (e.g., therapy plans, predicted outcomes, etc.), and/or other information associated with the medical device.

Various types of manufacturing systems are suitable for use in accordance with the embodiments herein. For example, the manufacturing system 624 can be configured for additive manufacturing, such as three-dimensional (3D) printing, stereolithography (SLA), digital light processing (DLP), fused deposition modeling (FDM), selective laser sintering (SLS), selective laser melting (SLM), selective heat sintering (SHM), electronic beam melting (EBM), laminated object manufacturing (LOM), powder bed printing (PP), thermoplastic printing, direct material deposition (DMD), inkjet photo resin printing, or like technologies, or combination thereof. Alternatively or in combination, the manufacturing system 624 can be configured for subtractive (traditional) manufacturing, such as CNC machining, electrical discharge machining (EDM), grinding, laser cutting, water jet machining, manual machining (e.g., milling, lathe/ turning), or like technologies, or combinations thereof. The manufacturing system 624 can manufacture one or more patient-specific medical devices based on fabrication instructions or data (e.g., CAD data, 3D data, digital blueprints, stereolithography data, or other data suitable for the various manufacturing technologies described herein). Different components of the system 600 can generate at least a portion of the manufacturing data used by the manufacturing system 624. The manufacturing data can include, without limitation, fabrication instructions (e.g., programs executable by additive manufacturing equipment, subtractive manufacturing equipment, etc.), 3D data, CAD data (e.g., CAD files), CAM data (e.g., CAM files), path data (e.g., print head paths, tool paths, etc.), material data, tolerance data, surface finish data (e.g., surface roughness data), regulatory data (e.g., FDA requirements, reimbursement data, etc.), or the like. The manufacturing system 624 can analyze the manufacturability of the implant design based on the received manufacturing data. The implant design can be finalized by altering geometries, surfaces, etc. and then generating manufacturing instructions. In some embodiments, the server 606 generates at least a portion of the manufacturing data, which is transmitted to the manufacturing system 624. The manufacturing system 624 can receive and send data using, for example, tokens, keys, ledgers, or the like.

The manufacturing system 624 can generate CAM data, print data (e.g., powder bed print data, thermoplastic print data, photo resin data, etc.), or the like and can include additive manufacturing equipment, subtractive manufacturing equipment, thermal processing equipment, or the like. The additive manufacturing equipment can be 3D printers, stereolithography devices, digital light processing devices, fused deposition modeling devices, selective laser sintering devices, selective laser melting devices, electronic beam melting devices, laminated object manufacturing devices, powder bed printers, thermoplastic printers, direct material deposition devices, or inkjet photo resin printers, or like technologies. The subtractive manufacturing equipment can be CNC machines, electrical discharge machines, grinders, laser cutters, water jet machines, manual machines (e.g., milling machines, lathes, etc.), or like technologies. Both additive and subtractive techniques can be used to produce implants with complex geometries, surface finishes, material properties, etc. The generated fabrication instructions can be configured to cause the manufacturing system 624 to manufacture the patient-specific orthopedic implant that matches or is therapeutically the same as the patient-specific design. The generated fabrication instructions can be tokenized into a fabrication token. In some embodiments, the patient-specific medical device can include features, materials, and designs shared across designs to simplify manufacturing. For example, deployable patient-specific medical devices for different patients can have similar internal deployment mechanisms but have different deployed configurations. In some embodiments, the components of the patient-specific medical devices are selected from a set of available prefabricated components and the selected pre-fabricated components can be modified based on the fabrication instructions or data.

Following the treatment of the patient in accordance with the treatment plan, treatment progress can be monitored over one or more time periods to update the data analysis module 616 and/or treatment planning module 618. Post-treatment data can be added to the reference data stored in the database 610 and used for post-operative analytics. The post-treatment data can be used to train machine learning models for developing patient-specific treatment plans, patient-specific medical devices, or combinations thereof.

It shall be appreciated that the components of the system 600 can be configured in many different ways. For example, in alternative embodiments, the database 610, the data analysis module 616 and/or the treatment planning module 618 can be components of the client computing device 602, rather than the server 606. As another example, the database 610, the data analysis module 616, and/or the treatment planning module 618 can be located across a plurality of different servers, computing systems, or other types of cloud-computing resources, rather than at a single server 606 or client computing device 602.

Additionally, in some embodiments, the system 600 can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, programmable consumer electronics, network PCs, minicomputers, mainframe computers, distributed computing environments that include any of the above systems or devices, or the like.

Figure 7:
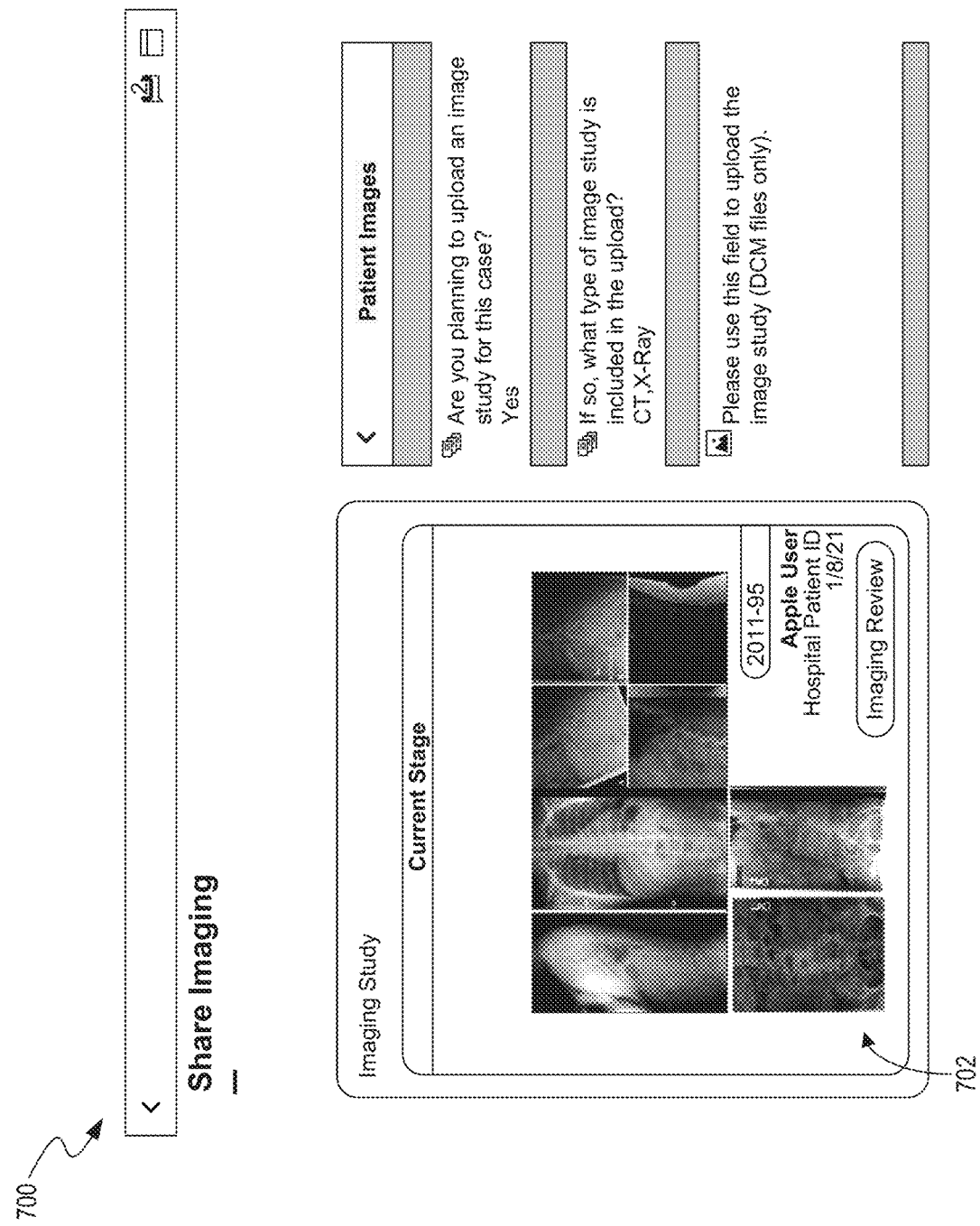
FIG. 7 illustrates an exemplary patient data set that may be used in connection with the methods described herein, according to an embodiment.

FIG. 7 illustrates an example of a healthcare data set 700 (e.g., as received in step 502 of FIG. 5) that can be converted to a token. The healthcare data 700 can include any of the information previously described with respect to healthcare data. For example, the healthcare data includes patient information (e.g., patient identification no., patient MRN, patient name, sex, age, body mass index (BMI), surgery date, surgeon, etc.), diagnostic information (e.g., Oswestry Disability Index (ODI), VAS-back score, VAS-leg score, Pre-operative pelvic incidence, pre-operative lumbar lordosis, pre-operative PI-LL angel, pre-operative lumbar coronal cobb, etc.), and image data 702 (x-ray, CT, MRI, etc.)

Figure 8:
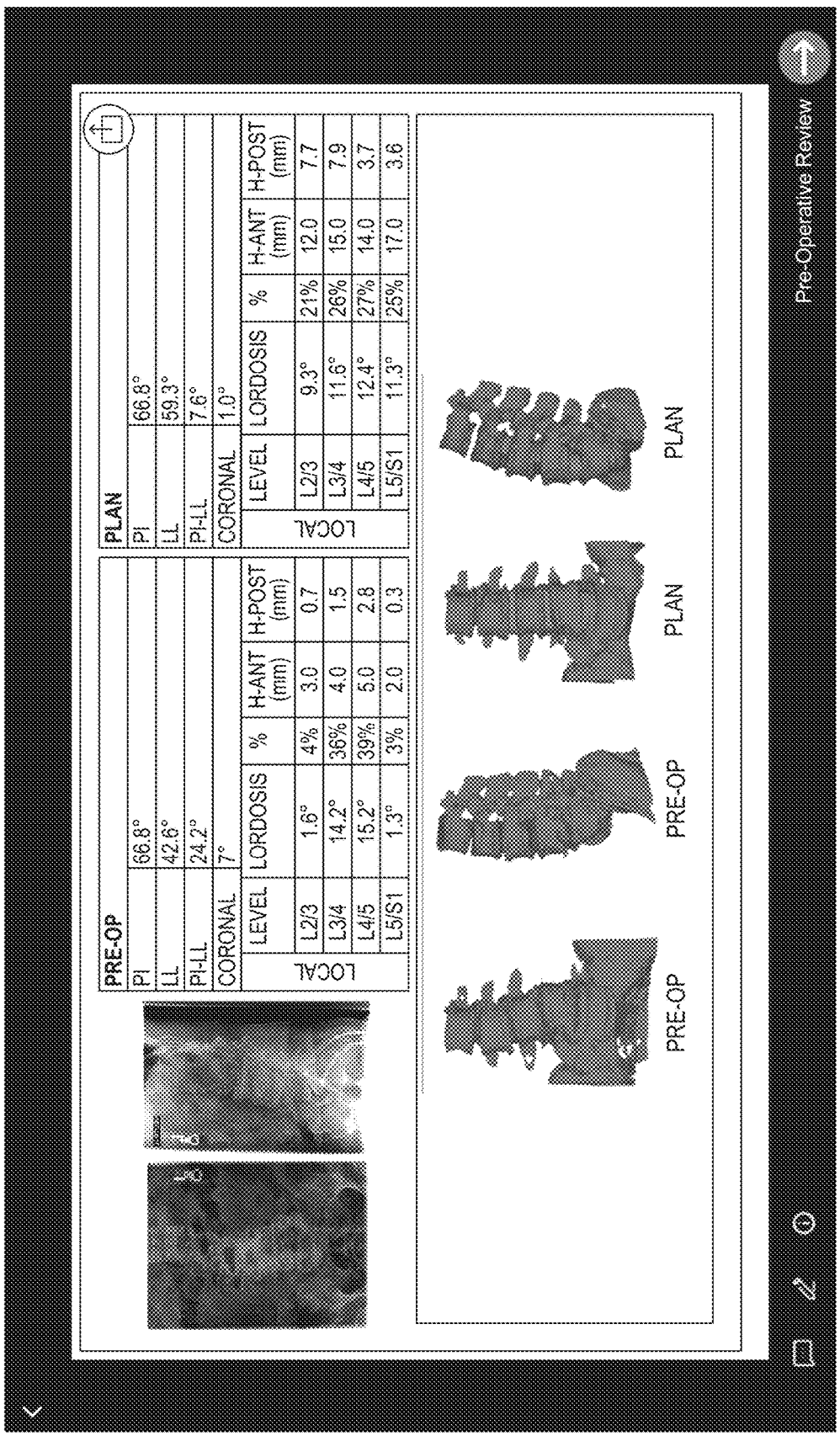
FIG. 8 illustrates an exemplary surgical plan report that may be used and/or generated in connection with the methods described herein, according to an embodiment.

FIG. 8 provides a series of images illustrating an example of a patient surgical plan report 800 that may be converted on a token and transmitted to a patient. The surgical plan report 800 can include an overview of a surgical plan, patient images, patient metrics, surgical details, and related information that the patient can view. The patient surgical plan report 800 can be presented to the patient on a digital display of a computing device (e.g., the client computing device 602 shown in FIG. 6). In some embodiments, the report 800 is interactive and the patient can manipulate various aspects of the report 800 (e.g., adjust views, zoom-in, zoom-out, annotate, etc.). The patient may provide questions or comments for the healthcare provider, which can be sent back to the computing system that generated the surgical plan report 800 for analysis and answers.

EXAMPLES

1. A method for managing patient medical records, the method comprising:
generating a request for a private key associated with a patient, the request including a request for patient authorization to access the private key;
receiving patient authorization to access the private key;
establishing communicative contact with a blockchain-enabled medical implant that is implanted in a body of the patient, the communicative contact being established using a proximity communication mode;
based on the patient authorization, accessing the private key stored on the blockchain-enabled medical implant;
accessing one or more electronic medical records associated with the patient from a distributed ledger of electronic medical records using the received private key, wherein
the distributed ledger represents a private blockchain ledger or a public blockchain ledger storing the one or more electronic medical records as private transactions, and
each electronic medical record is stored as a hashed transaction in the distributed ledger of electronic medical records, and
the private key associated with the patient is used to access details of hashed transactions associated with the patient; and displaying the one or more electronic medical records associated with the patient.

2. The method of example 1, wherein the patient provides patient authorization to access the private key using a confirmation mechanism, wherein the confirmation mechanism is a voice confirmation, entering a password into a software application, entering a password into a web application, entering a password into a mobile application, or providing an e-signature to a physician.

3. The method of any one or a combination of examples 1 or 2, wherein the proximity communication mode is a radio frequency communication mode.

4. The method of any one or a combination of examples 1-3, wherein accessing the private key includes:
  receiving encoded data from the blockchain-enabled medical implant according to a radio frequency communication mode; and
  deriving the private key based on decrypting the encoded data using the patient authorization or a portion thereof.

5. The method of any one or a combination of examples 1-4, wherein the distributed ledger of electronic medical records is stored in a memory of the blockchain-enabled medical implant.

6. The method of any one or a combination of examples 1-5, wherein
  the communicative contact with the blockchain-enabled medical implant is established through an intermediary device that is on or implanted in the body of the patient and communicatively coupled to the blockchain-enabled medical implant; and
  the private key is accessed through the intermediary device.

7. The method of any one or a combination of examples 1-6, wherein the one or more accessed electronic medical records corresponds to an access permission setting previously provided by the patient for the access.

8. A method for managing an electronic medical record for a patient, the method comprising:
  receiving patient treatment information associated with a patient, the patient treatment information including information associated with patient diagnosis and treatment;
  generating an electronic medical record, the electronic medical record including details associated with the received patient treatment information and a unique patient identifier;
  generating a blockchain transaction based on the electronic medical record, a public key and a private key, wherein
    the public key and the private key are a matching pair directly associated with the unique patient identifier,
    the private key configured for accessing the details of the blockchain transaction, and
    the private key is stored on a blockchain-enabled medical implant that is implanted in a body of the patient; and
  adding the blockchain transaction to a distributed ledger of transactions associated with the patient, wherein the blockchain transaction is added to a private ledger or as a private transaction to a public ledger.

9. The method of example 8, wherein the patient treatment information includes patient data, one or more medical images associated with the patient, one or more scans associated with the patient, demographic information about the patient, identifying information of the patient, historical patient treatment data, metrics, patient treatment plans, data providing pathology-related information of the patient, provider, patient feedback data, vital signs, diagnostic results, patient family history of illnesses or medical problems, and/or prescription drug history of the patient.

10. The method of any one or a combination of examples 8-9, wherein the electronic medical record further includes information associated with a physician delivering treatment to the patient and/or information associated with a facility delivering treatment to the patient.

11. The method of any one or a combination of examples 8-10, wherein the distributed ledger of transactions is the private ledger of transactions associated with the patient, and wherein the private key associated with the patient is required to access the distributed ledger of transactions.

12. The method of any one or a combination of examples 8-11, wherein the distributed ledger of transactions is stored in a memory of the blockchain-enabled medical implant.

13. The method of any one or a combination of examples 8-12, wherein the distributed ledger of transactions is the public ledger of transactions, and wherein the private key associated with the patient is used to access transactions associated with the patient stored on the public ledger of transactions.

14. The method of any one or a combination of examples 8-13, wherein the electronic medical record further includes one or more permissions defining one or more portions of the medical record can be accessed by a particular user.

15. A medical implant comprising:
  a physical structure configured to secure the medical implant within a body of a patient;
  a proximity communication component physically coupled to the physical structure; and
  a memory operatively coupled to the proximity communication component, the memory storing a private key, wherein the memory is configured to provide the private key through the proximity communication component to an external device for enabling the external device to access one or more electronic medical records associated with a patient that is implanted with the implant from a distributed blockchain ledger of electronic medical records.

16. The medical implant of example 15, wherein the medical implant is a pedicle screw, a patient-specific implant, an interbody implant system, an artificial disc, an expandable intervertebral implant, a sacroiliac implant, a plate, an arthroplasty device for orthopedic joints, a non-structural implant, or a multi-purpose implant.

17. The medical implant of any one or a combination of examples 15-16, further comprising:
  one or more sensors configured to measure pressures, loads, or forces applied by anatomical elements of the patient; and
  one or more processors configured to perform a process, the process comprising:
    receiving data from the one or more sensors;
    determining one or more of an activity level, activities performed, or disease progression based on the received data; and
    communicating, by the proximity communication component, the one or more of the activity level, activities performed, or disease progression to an external computing system.

18. The medical implant of any one or a combination of examples 15-17, further comprising:
  a secondary implant comprising a second proximity communication component, wherein the proximity communication component communicates with the second proximity communication component; and wherein the second proximity communication component communicates with the proximity communication component and one or more external computing devices.

19. The medical implant of any one or a combination of examples 15-18, wherein the medical implant is a blockchain-enabled spinal implant and the secondary implant is a subcutaneous digital implant.

20. The medical implant of any one or a combination of examples 15-19, wherein the memory further stores one or more electronic medical records associated with the patient.

21. The medical implant of any one or a combination of examples 15-20, wherein the memory further stores a private distributed ledger of transactions associated with electronic medical records of the patient.

22. A system comprising:
one or more processors; and
one or more memories storing instructions that, when executed by the one or more processors, cause the system to perform a process for managing patient medical records, the process comprising:
generating a request for a private key associated with a patient, the request including a request for patient authorization to access the private key;
receiving patient authorization to access the private key;
establishing communicative contact with a blockchain-enabled medical implant that is implanted in a body of the patient, the communicative contact being established using a proximity communication mode;
based on the patient authorization, accessing the private key stored on the blockchain-enabled medical implant;
accessing one or more electronic medical records associated with the patient from a distributed ledger of electronic medical records using the received private key, wherein
the distributed ledger represents a private blockchain ledger or a public blockchain ledger storing the one or more electronic medical records as private transactions, and
each electronic medical record is stored as a hashed transaction in the distributed ledger of electronic medical records, and
the private key associated with the patient is used to access details of hashed transactions associated with the patient; and
displaying the one or more electronic medical records associated with the patient.

23. The system according to example 22, wherein the patient provides patient authorization to access the private key using a confirmation mechanism, wherein the confirmation mechanism is a voice confirmation, entering a password into a software application, entering a password into a web application, entering a password into a mobile application, or providing an e-signature to a physician.

24. The system of any one or a combination of examples 22-23, wherein the proximity communication mode is a radio frequency communication mode.

25. The system of any one or a combination of examples 22-24, wherein accessing the private key includes:
receiving encoded data from the blockchain-enabled medical implant according to a radio frequency communication mode; and
deriving the private key based on decrypting the encoded data using the patient authorization or a portion thereof.

26. The system of any one or a combination of examples 22-25, wherein the distributed ledger of electronic medical records is stored in a memory of the blockchain-enabled medical implant.

27. The system of any one or a combination of examples 22-26, wherein
the communicative contact with the blockchain-enabled medical implant is established through an intermediary device that is on or implanted in the body of the patient and communicatively coupled to the blockchain-enabled medical implant; and
the private key is accessed through the intermediary device.

28. The system of any one or a combination of examples 22-27, wherein the one or more accessed electronic medical records corresponds to an access permission setting previously provided by the patient for the access.

29. A non-transitory computer-readable medium storing instructions that, when executed by a computing system, cause the computing system to perform operations for managing patient medical records, the operations comprising:
generating a request for a private key associated with a patient, the request including a request for patient authorization to access the private key;
receiving patient authorization to access the private key;
establishing communicative contact with a blockchain-enabled medical implant that is implanted in a body of the patient, the communicative contact being established using a proximity communication mode;
based on the patient authorization, accessing the private key stored on the blockchain-enabled medical implant;
accessing one or more electronic medical records associated with the patient from a distributed ledger of electronic medical records using the received private key, wherein
the distributed ledger represents a private blockchain ledger or a public blockchain ledger storing the one or more electronic medical records as private transactions, and
each electronic medical record is stored as a hashed transaction in the distributed ledger of electronic medical records, and
the private key associated with the patient is used to access details of hashed transactions associated with the patient; and
displaying or providing the one or more electronic medical records associated with the patient.

30. The non-transitory computer-readable medium of example 29, wherein the patient provides patient authorization to access the private key using a confirmation mechanism, wherein the confirmation mechanism is a voice confirmation, entering a password into a software application, entering a password into a web application, entering a password into a mobile application, or providing an e-signature to a physician.

31. The non-transitory computer-readable medium of any one or a combination of examples 29-30, wherein the proximity communication mode is a radio frequency communication mode.

32. The non-transitory computer-readable medium of any one or a combination of examples 29-31, wherein accessing the private key includes:
receiving encoded data from the blockchain-enabled medical implant according to a radio frequency communication mode; and deriving the private key based on decrypting the encoded data using the patient authorization or a portion thereof.

33. The non-transitory computer-readable medium of any one or a combination of examples 29-32, wherein the distributed ledger of electronic medical records is stored in a memory of the blockchain-enabled medical implant.

34. The non-transitory computer-readable medium of any one or a combination of examples 29-33, wherein
the communicative contact with the blockchain-enabled medical implant is established through an intermediary device that is on or implanted in the body of the patient and communicatively coupled to the blockchain-enabled medical implant; and
the private key is accessed through the intermediary device.

35. The non-transitory computer-readable medium of any one or a combination of examples 29-34, wherein the one or more accessed electronic medical records corresponds to an access permission setting previously provided by the patient for the access.

36. A computing system for perform operations to manage patient medical records, the operations comprising:
generating a request for a private key associated with a patient, the request including a request for patient authorization to access the private key;
receiving patient authorization to access the private key;
accessing the private key associated with the patient;
accessing one or more electronic medical records associated with the patient from a distributed ledger of electronic medical records using the received private key, wherein
the distributed ledger represents a private blockchain ledger or a public blockchain ledger storing the one or more electronic medical records as private transactions, and
one or more of the electronic medical records is stored as a hashed transaction in the distributed ledger of electronic medical records, and
the private key associated with the patient is used to access details of hashed transactions associated with the patient.

37. The system of example 36, wherein the patient provides patient authorization to access the private key using a confirmation mechanism, wherein the confirmation mechanism is at least one of a voice confirmation, entering a password into a software application, entering a password into a web application, entering a password into a mobile application, or providing an e-signature to a physician.

38. The system of any one or a combination of examples 36-37, wherein the proximity communication mode is a radio frequency communication mode.

39. The system of any one or a combination of examples 36-38, wherein accessing the private key includes:
receiving encoded data from the blockchain-enabled medical implant according to a radio frequency communication mode; and
deriving the private key based on decrypting the encoded data using the patient authorization or a portion thereof.

40. The system of any one or a combination of examples 36-39, wherein the distributed ledger of electronic medical records is stored in a memory of the blockchain-enabled medical implant.

41. The system of any one or a combination of examples 36-40, wherein
the communicative contact with the blockchain-enabled medical implant is established through an intermediary device that is on or implanted in the body of the patient and communicatively coupled to the blockchain-enabled medical implant; and
the private key is accessed through the intermediary device.

42. The system of any one or a combination of examples 36-41, wherein the one or more accessed electronic medical records corresponds to an access permission setting previously provided by the patient for the access.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology may include not only additional elements to those embodiments noted above, but also may include fewer elements.

The embodiments, features, systems, devices, materials, methods and techniques described herein may, in some embodiments, be similar to any one or more of the embodiments, features, systems, devices, materials, methods and techniques described in the following:

U.S. application Ser. No. 16/048,167, filed on Jul. 27, 2018, titled "SYSTEMS AND METHODS FOR ASSISTING AND AUGMENTING SURGICAL PROCEDURES";

U.S. application Ser. No. 16/242,877, filed on Jan. 8, 2019, titled "SYSTEMS AND METHODS OF ASSISTING A SURGEON WITH SCREW PLACEMENT DURING SPINAL SURGERY";

U.S. application Ser. No. 16/207,116, filed on Dec. 1, 2018, titled "SYSTEMS AND METHODS FOR MULTI-PLANAR ORTHOPEDIC ALIGNMENT";

U.S. application Ser. No. 16/352,699, filed on Mar. 13, 2019, titled "SYSTEMS AND METHODS FOR ORTHOPEDIC IMPLANT FIXATION";

U.S. application Ser. No. 16/383,215, filed on Apr. 12, 2019, titled "SYSTEMS AND METHODS FOR ORTHOPEDIC IMPLANT FIXATION";

U.S. application Ser. No. 16/569,494, filed on Sep. 12, 2019, titled "SYSTEMS AND METHODS FOR ORTHOPEDIC IMPLANTS";

U.S. application Ser. No. 16/699,447, filed on Nov. 29, 2019, titled "SYSTEMS AND METHODS FOR ORTHOPEDIC IMPLANTS";

U.S. application Ser. No. 17/085,564, filed on Oct. 30, 2020, titled "SYSTEMS AND METHODS FOR DESIGNING ORTHOPEDIC IMPLANTS BASED ON TISSUE CHARACTERISTICS";

U.S. application Ser. No. 16/735,222, filed Jan. 6, 2020, titled "PATIENT-SPECIFIC MEDICAL PROCEDURES AND DEVICES, AND ASSOCIATED SYSTEMS AND METHODS";

U.S. Application Ser. No. 16/987,113, filed Aug. 6, 2020, titled "PATIENT-SPECIFIC ARTIFICIAL DISCS, IMPLANTS AND ASSOCIATED SYSTEMS AND METHODS";

U.S. application Ser. No. 17/100,396, filed Nov. 20, 2020, titled "PATIENT-SPECIFIC VERTEBRAL IMPLANTS WITH POSITIONING FEATURES";

U.S. application Ser. No. 16/990,810, filed Aug. 11, 2020, titled "LINKING PATIENT-SPECIFIC MEDICAL DEVICES WITH PATIENT-SPECIFIC DATA, AND ASSOCIATED SYSTEMS, DEVICES, AND METHODS";

U.S. application Ser. No. 17/463,054, filed Aug. 31, 2021, titled "BLOCKCHAIN MANAGED MEDICAL IMPLANTS";

U.S. application Ser. No. 17/085,564, filed Oct. 30, 2020, titled "SYSTEMS AND METHODS FOR DESIGNING ORTHOPEDIC IMPLANTS BASED ON TISSUE CHARACTERISTICS";

U.S. application Ser. No. 17/678,874, filed Feb. 23, 2022, titled "NON-FUNGIBLE TOKEN SYSTEMS AND METHODS FOR STORING AND ACCESSING HEALTHCARE DATA";

U.S. application Ser. No. 17/100,396, filed Nov. 20, 2020, titled "PATIENT-SPECIFIC VERTEBRAL IMPLANTS WITH POSITIONING FEATURES"; and U.S. application Ser. No. 17/342,439, filed Jun. 8, 2021, titled "PATIENT-SPECIFIC MEDICAL PROCEDURES AND DEVICES, AND ASSOCIATED SYSTEMS AND METHODS."

All of the above-identified patents and applications are incorporated by reference in their entireties.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A spinal implant configured to securely mate with anatomical elements in a patient, the spinal implant comprising:
   an intervertebral cage body having
      a patient-specific textured upper surface configured to engage a first vertebral endplate of the patient, and
      a patient-specific textured lower surface configured to engage a second vertebral endplate of the patient, wherein the patient-specific textured upper surface is angled with respect to the patient-specific textured lower surface for lordotic correction;
   a proximity communication component inside the intervertebral cage body; and
   a memory inside the intervertebral cage body and operatively coupled to the proximity communication component, the memory storing data after the spinal implant is implanted in the patient, wherein the data includes
      texturing data associated with manufacturing of the patient-specific textured upper surface and the patient-specific textured lower surface, and
      a private key, wherein the memory is configured to provide the private key through the proximity communication component to an external device for enabling the external device to access one or more electronic medical records associated with the patient in which the spinal implant is implanted, from a distributed blockchain ledger of electronic medical records.

2. The spinal implant of claim 1, further comprising:
   one or more sensors inside the intervertebral cage body and configured to measure at least one of pressures, loads, or forces applied by anatomical elements of the patient to the spinal implant; and one or more processors configured to perform a process comprising:
receiving data from the one or more sensors;
determining one or more of an activity level, activities performed, or disease progression based on the received data; and
communicating, by the proximity communication component, the one or more of the activity level, activities performed, or disease progression to an external computing system.

3. The spinal implant of claim 1, further comprising:
a secondary implant comprising a second proximity communication component, wherein the proximity communication component communicates with the second proximity communication component and communicates with and one or more external computing devices.

4. The spinal implant of claim 1, wherein the proximity communication component is configured to operate using radio frequency communication, near field communication, or Bluetooth communication protocols.

5. The spinal implant of claim 1, wherein the memory further stores manufacturing data including material specifications and dimensions of the intervertebral cage body.

6. The spinal implant of claim 1, wherein the memory further stores implant configuration data including dimensions of the intervertebral cage body, contours of the patient-specific textured upper surface and the patient-specific textured lower surface, and one or more angular measurements between the patient-specific textured upper surface and the patient-specific textured lower surface.

7. The spinal implant of claim 1, wherein the memory further stores pre-operative patient data and a surgical plan for the spinal implant, wherein the pre-operative patient data includes anatomical measurements, and wherein the surgical plan includes positioning information for placement of the intervertebral cage body between the first vertebral endplate and the second vertebral endplate.

8. A spinal implant comprising:
a spinal implant body configured for implantation between vertebrae of a patient;
a wireless transmitter integrated within the spinal implant body; and
a data storage component operatively connected to the wireless transmitter, the data storage component configured to store:
a private key,
patient data,
implant configuration data including one or more properties of the spinal implant body, and
cryptographic authentication data for accessing remotely stored electronic medical records of the patient associated with a blockchain ledger while the spinal implant is within the patient's body, wherein the wireless transmitter is configured to transmit the cryptographic authentication data to an external computing device upon receiving an authorization signal, and wherein the electronic medical records include a surgical report with one or more images of the patient's anatomy affected by the spinal implant body.

9. The spinal implant of claim 8, wherein the spinal implant body comprises an interbody cage configured for a spinal fusion procedure, wherein the interbody cage has one or more custom surfaces with contours matching contours of vertebral endplates of the patient.

10. The spinal implant of claim 8, wherein the wireless transmitter is configured to operate using at least one of radio frequency identification (RFID), near field communication (NFC), or wireless local area network (WLAN) protocols.

11. The spinal implant of claim 8, wherein the data storage component further stores post-operative monitoring data collected from one or more sensors embedded in the spinal implant body.

12. The spinal implant of claim 8, wherein the cryptographic authentication data comprises a digital certificate that enables decryption of encrypted medical records stored on the blockchain ledger.

13. The spinal implant of claim 8, further comprising:
one or more sensors inside the spinal implant body and configured to measure at least one of pressures, loads, or forces applied by anatomical elements of the patient to the spinal implant.

14. The spinal implant of claim 8, wherein the data storage component further stores manufacturing data including material specifications, dimensional parameters, texturing data associated with the spinal implant body.

15. A spinal implant configured for implantation in a patient, the spinal implant comprising:
an intervertebral cage body having one or more patient-specific features configured to engage at least one vertebral endplate of the patient;
a proximity communication component inside the intervertebral cage body; and
a memory physically coupled to the intervertebral cage body and operatively coupled to the proximity communication component, the memory storing data after the spinal implant is implanted in the patient, wherein the data includes
at least one of design data or manufacturing data of the one or more patient-specific features, and
a private key, wherein the spinal implant is configured to transmit the private key to an external device for enabling remote access one or more electronic medical records associated with the patient.

16. The spinal implant of claim 15, further comprising:
one or more sensors configured to measure at least one of pressures, loads, or forces applied by anatomical elements of the patient to the spinal implant.

17. The spinal implant of claim 15, wherein the memory further stores patient-specific dimensional data including height measurements, width measurements, and depth measurements of the intervertebral cage body that correspond to anatomical spacing between two or more patient vertebral endplates.

18. The spinal implant of claim 15, wherein the proximity communication component is configured to operate using radio frequency identification (RFID) technology and is configured to transmit the private key when activated by an external reader device positioned within a predetermined proximity range.

19. The spinal implant of claim 15, wherein the memory further stores implant configuration data including at least one of dimensions, contours, or angular measurements associated with the intervertebral cage body.

20. The spinal implant of claim 15, wherein the memory further stores at least one of pre-operative patient data or surgical plan data associated with the spinal implant.

* * * * *